United States Patent
Taggart et al.

(10) Patent No.: US 9,697,579 B2
(45) Date of Patent: Jul. 4, 2017

(54) MULTI-PROCESSOR GRAPHICS RENDERING

(71) Applicant: Apple Inc., Cupertino, CA (US)

(72) Inventors: Angus M. Taggart, San Diego, CA (US); Eric J. Graves, Radnor, PA (US); Jean-Francois N. Dumais, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 180 days.

(21) Appl. No.: 14/055,782

(22) Filed: Oct. 16, 2013

(65) Prior Publication Data

US 2014/0368516 A1 Dec. 18, 2014

Related U.S. Application Data

(60) Provisional application No. 61/832,726, filed on Jun. 7, 2013.

(51) Int. Cl.
*G06T 1/20* (2006.01)
*G06T 15/00* (2011.01)

(52) U.S. Cl.
CPC ............. *G06T 1/20* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 5,655,151 A * | 8/1997 | Bowes et al. | 710/22 |
| 8,963,918 B2 * | 2/2015 | Zhou et al. | 345/420 |
| 9,064,324 B2 * | 6/2015 | Ooguni | |
| 2005/0278408 A1 * | 12/2005 | Matsumoto | H04L 67/1008 709/200 |
| 2006/0114254 A1 * | 6/2006 | Day et al. | 345/424 |
| 2006/0190942 A1 * | 8/2006 | Inoue | G06F 9/4856 718/100 |
| 2008/0005547 A1 * | 1/2008 | Papakipos et al. | 712/244 |
| 2008/0229319 A1 * | 9/2008 | Marchand | 718/104 |
| 2014/0176583 A1 * | 6/2014 | Abiezzi et al. | 345/522 |
| 2014/0344826 A1 * | 11/2014 | Wu | 718/104 |

OTHER PUBLICATIONS

Shen ("Accelerate Video Decoding With Generic GPU", 2005, IEEE, vol. 15, No. 5).*

* cited by examiner

*Primary Examiner* — Kee M Tung
*Assistant Examiner* — Xin Sheng
(74) *Attorney, Agent, or Firm* — Blake Jackson; Page Ponsford; DLA Piper LLP US

(57) ABSTRACT

An operating system that includes an image processing framework as well as a job management layer is provided. The image processing framework is for performing image processing operations and the job management layer is for assigning the image processing operations to multiple concurrent computing resources. The computing resources include several processing units and one or more direct memory access (DMA) channels for concurrently rendering image data and transferring image data between the processing units.

26 Claims, 14 Drawing Sheets

MULTI-PROCESSOR GRAPHICS RENDERING

BACKGROUND

Digital graphic design, image editing, and video editing applications (hereafter collectively referred to as "client" applications) provide graphical designers, media artists, and other users with the necessary tools to create a variety of media content. Examples of such applications include Final Cut Pro® and iMovie®, both sold by Apple® Inc. Applications such as these give users the ability to generate 2D and 3D computer graphics and computer animations, as well as to edit, combine, transition, overlay, and piece together different media content in a variety of manners to create a resulting media project. The resulting media project specifies a combination of audio and/or video content that is used to create a media presentation.

The media presentation may be rendered using various resources in order to produce the final video output. Different systems may include different rendering hardware. In some cases, one or more graphics processing units ("GPU") may be used to render the media presentation, while in other cases one or more central processing units ("CPU") may be used to render the media composition. In addition, some applications may use a combination of one or more GPUs and one or more CPUs (and/or multi-core CPUs) to render the media presentation. These different resources promise significant boost in performance of graphic rendering if the system is able to effectively manage these resources as concurrent rendering resources.

The various available GPUs and/or CPUs may each execute different formats of computer code. In addition, different CPUs and GPUs have different capabilities and limitations. For these reasons, code developers may have to spend a substantial amount of time manually translating code to run on different platforms, optimizing the code for efficient performance on the different platforms, and/or generating various support functions and parameters needed by the different platforms. Furthermore, substantial effort has to be invested by code developers in order to enable concurrent job execution across the different rendering resources before the promised gain in performance can be realized.

Thus, there is a need for an image processing framework capable of effectively utilizing the multiple different rendering resources concurrently in order to deliver the performance needed by high throughput image processing applications.

SUMMARY

Some embodiments of the invention provide an operating system that includes an image processing framework as well as a job management layer. The image processing framework is for performing image processing operations and the job management layer is for assigning the image processing operations to multiple concurrent computing resources. In some embodiments, the concurrent computing resources include several processing units for rendering and one or more direct memory access (DMA) channels for transferring data between memory structures associated with the rendering processing units.

In some embodiments, the image processing operations are divided into logically independent image processing jobs. The job management layer creates one or more queues for queuing the image processing jobs. Each image processing job specifies a rendering computing resource and a destination memory structure for storing the output of the image processing job. In some embodiments, the job management layer creates a data transfer job when the destination memory structure is not directly accessible by the rendering computing resource. In some embodiments, the concurrent rendering resources include a CPU and multiple GPUs.

The job management layer in some embodiments sets up storage queues for different types of rendering jobs. The job management layer also includes routines to select jobs from the storage queues. A selected job is assigned to processing threads of a rendering resource or of a DMA channels. A rendering job can specify, prefer, or eschew a particular computing resource or a particular class of computing resources. A rendering job that specifies a specific resource can only be performed at that specific resource. A rendering job that prefers a specific resource can be performed by any resource, but would be assigned to the preferred resource if available. A rendering job can also specify that any resource may be used to perform the job. In some embodiments, the job management layer would assign such jobs to a computing resource as to facilitate load-balancing across all rendering resources.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide an operating system that includes an image processing framework as well as a job management layer. The image processing framework is for performing image processing operations and the job management layer is for assigning the image processing operations to multiple concurrent computing resources. In some embodiments, the concurrent computing resources include several processing units for rendering and one or more direct memory access (DMA) channels for transferring data between memory structures associated with the rendering processing units.

In some embodiments, the image processing framework divides the image processing operations into logically independent image processing jobs. The job management layer creates one or more queues for queuing the image processing jobs. Each image processing job specifies a rendering computing resource and a destination memory structure for storing the output of the image processing job. In some embodiments, the job management layer creates a data transfer job when the destination memory structure is not directly accessible by the rendering computing resource.

Figure 1:
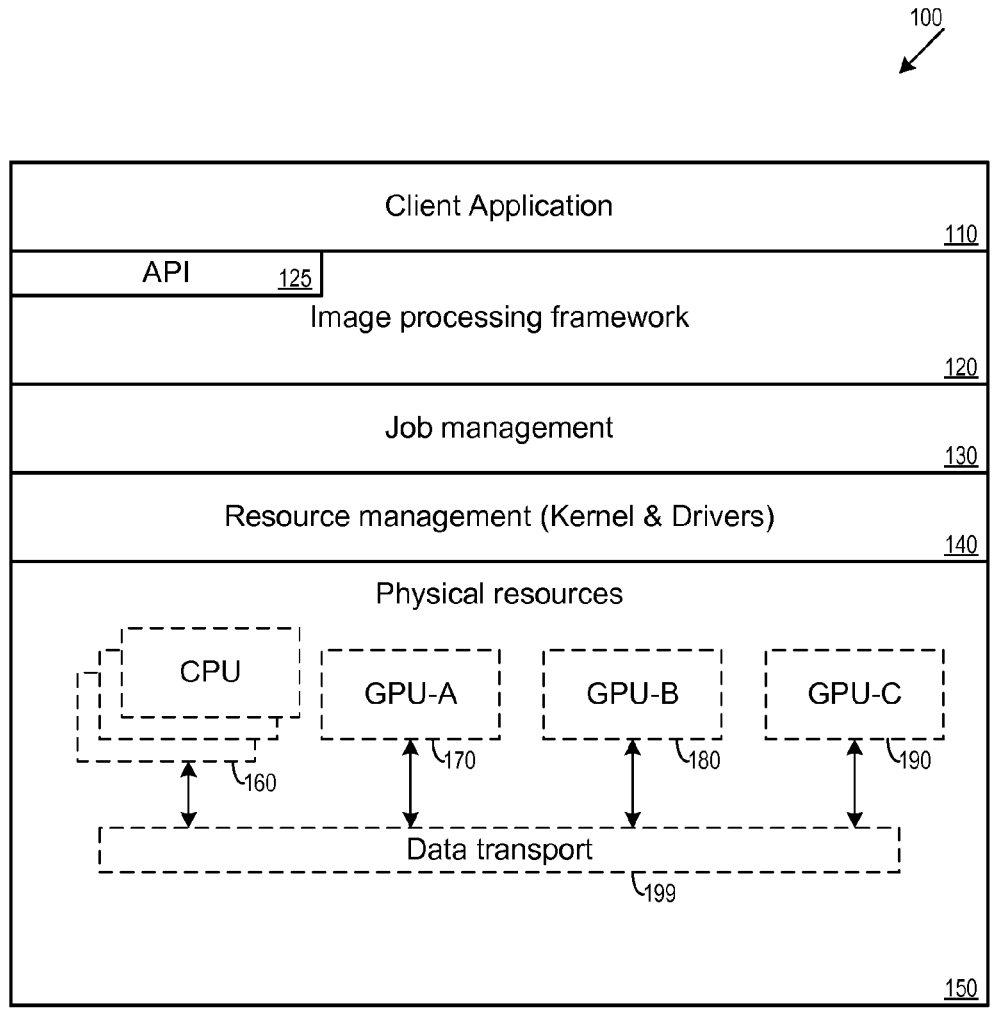
FIG. 1 illustrates a media processing stack of some embodiments.

FIG. 1 illustrates a media processing stack 100 of some embodiments. This stack represents the various different software modules that are used in some embodiments to process media content and to generate and display a presentation of the media content. As shown in FIG. 1, the media processing stack 100 includes several layers: a client application layer 110, an image processing layer 120, a job management layer 130, a resource management layer 140, and a physical resource layer 150. In some embodiments, the job management layer and the resource management layer 140 are provided by the operating system (OS) of a computer system. The job management layer 130 and the resource management layer 140 are therefore considered as being part of an OS layer in some embodiments. In some embodiments, the layers 110-150 reside on one computing device, although other embodiments might implement these layers on multiple computing devices.

The client application layer 110 includes one or more client media applications that process media content. For instance, in some embodiments, the applications include media editing applications that create composite presentations from one or more media clips (video clips, audio clips, etc.). Examples of such media editing applications include Final Cut Pro®, iMovie®, Shake®, Motion®, iPhoto®, etc. One of ordinary skill in the art will understand that other specific media editing applications may be included in the client application layer 110. In some cases, the media editing applications may be supplied by a single vendor, while in other cases the applications may be supplied by different vendors.

The image processing layer 120 includes an image processing framework. In some embodiments, this framework includes one or more engines for facilitating the operations of one or more media client applications. For example, in some embodiments, the image processing framework includes one or more engines (e.g., rendering engines, graph-generation engines, etc.) that are used by one or more media editing applications to render composite presentations that are produced by the client applications. In addition to these engines, the framework of some embodiments includes a graphics compiler that is used by the developers of the client applications to generate one or more image-processing toolkits for the image processing framework 120. In some embodiments, these image processing toolkits are used to transform the media editing operations of the client applications into rendering commands that can be processed by the rendering engine of the image processing framework.

A software framework such as the image processing framework is an abstraction layer that may include support programs, code libraries, a scripting language, or other software to help develop and link together various components of a software project. Sections of the framework may be accessed through application programming interfaces 125 ("API"). A framework provides generic functionality that may be specialized to provide functionality that is specific to a particular client application. An API includes a set of routines, data structures, object classes and/or protocols provided by software libraries and/or operating system services that support the building of applications. An API itself is largely abstract in that it specifies an interface and controls the behavior of the objects specified in that interface. The software that provides the functionality described by an API is said to be an "implementation" of the API. An API is typically defined in terms of the programming language used to build an application. The term "API" may be used to refer to a full interface, a single function, or a set APIs provided by a framework.

In some embodiments, the image processing framework 120 receives data, instructions, and/or commands from the client application layer 110 at compile-time and uses the received data, instructions, and/or commands to generate an image-processing toolkit. Such a toolkit may be passed back to the client application, stored in memory (not shown), or otherwise preserved for future use. The image processing framework 120 of some embodiments also receives data from the client application 110 layer at run-time. The framework, in turn, generates instructions, data, and/or commands that may be passed through the OS and assorted drivers in the resource management layer 140 before being sent to the appropriate hardware for execution. The rendering resources are thus transparent to the client application layer 110. In other words, each client application in the client application layer 110 needs only to provide data to the image processing framework 120 without regard for the particular rendering resource that will execute the rendering operation(s).

In some embodiments, the image processing framework 120 has a graph-based node compiler, a render graph generator, and/or a graph execution engine. The graphics compiler is used to transform fragment programs into render graph nodes or processing nodes. A fragment program may include one or more image processing algorithms. These algorithms may be coded as fragment programs using various formats (e.g., Architecture Review Board ("ARB") shading language, Open Graphics Library ("OpenGL") shading language ("GLSL"), C-like programming language for graphics ("Cg"), and/or open computing language ("OpenCL" or "CL")). The graphics compiler, in turn, creates a render graph node from a particular fragment program. Such a render graph node may be executed on a variety of rendering resources (i.e., various CPUs and/or GPUs may be used to execute the node). In some embodiments, the render graph node includes code that has been optimized for use on each of these different rendering resources. For instance, the render graph node may include SSE-optimized and AltiVec-optimized CPU code, as well as different code variants of the fragment program that take advantage of different GPU-specific capabilities.

In addition to including various code types, the render graph nodes of some embodiments include other functions used for setup, initialization, and optimization at render time. Furthermore, the render graph nodes may include various handles, tags, and pointers that facilitate efficient execution of the nodes. Once generated, these render graph nodes may be stored in a library (or image-processing "toolkit") in some embodiments such that the nodes will be available at render time (i.e., when a render graph is generated and executed).

Different client applications may generate and apply graphs to different sections of a media presentation in various ways. For instance, in some cases, the client application will generate one graph for each frame of the media presentation. In other cases, the client application may generate one graph for each segment of the media presentation, where the parameters of the graph may change from frame to frame.

The physical resource layer 150 includes the various hardware resources that are available to the media processing stack 100. These resources execute various operations as specified by a client application 110 (and processed by the framework 120 and OS layers 130 and 140). These hardware resources include a CPU 160 and a set of GPUs 170-190. In some embodiments, the CPU 160 and the GPUs 170-190 can operate concurrently to perform image processing jobs requested by the client application 110. Some embodiments use these multiple processing units (CPU and GPUs) as concurrent rendering resources in order to generate image data at sufficient performance level to support real-time playback. In some embodiments, the different image processing jobs being performed concurrently across the different processing units are for rendering a same video frame.

The physical resource layer 150 also includes a data transport 199 for transporting data between the CPU and the GPUs. In some embodiments, the transported data include image output buffers, bitmaps, or other types of data that are generated and processed by the CPU and the GPUs. In some embodiments, the transport of data is performed by directly accessing the memories that are associated with the CPU and the GPUs and can be performed while the CPUs and the GPUs are performing image processing jobs.

The resource management layer 140 serves as the bridge between applications and the actual data processing done at the hardware level. The resource management layer 140 includes a kernel. A kernel provides the lowest-level abstraction layer for the physical computing resources that the client application software must control in order to perform its functions. The kernel controls the device drivers that are needed by the client applications to access and control the physical computing resources.

The device drivers in the resource management layer 140 allow higher-level computer programs to interact with a hardware device in the physical resources layer 150 (such CPU 160, one of GPUs 170-190, or the data transport 199). A device driver is a computer program that enables the operating system to interact with a hardware device. It provides the operating system with information of how to control and communicate with a certain piece of hardware. A driver for a particular device typically communicates with that particular device through a computer bus or communications subsystem to which the hardware is connected. When a calling program invokes a routine in the driver, the driver issues commands to the device. Once the device sends data back to the driver, the driver may invoke routines in the original calling program. Drivers are typically hardware-dependent and OS-specific.

In addition to the resource management layer 140, the media processing stack 100 also includes the job management layer 130 for managing the assignment of tasks and processes from the client application 110 to the physical computing resources. As mentioned, at least some of the resources in the physical resource layer 150 can operate concurrently to perform image processing jobs requested by the client application 110. For instance, GPU-A 170 and GPU-B 180 can simultaneously perform rendering jobs requested by the client application 110 while the data transport 190 copies the output buffer of a previous rendering job from the video memory of GPU-A to the system memory for the CPU. In order to facilitate the utilization of these and other the concurrent computing resources, the job management layer 130 provides encapsulated routines to the client application 110 for dispatching rendering jobs and other tasks to the physical resources in 150. In some embodiments, the job management layer sets up different queues for dispatching different types of jobs to different resources.

Section I below will describe the hardware of the concurrent computing resources. Section II below will describe the management of the concurrent computing resources. Section III describes a computer system with which some embodiments of the invention are implemented.

I. Concurrent Computing Resources

As mentioned, the media processing stack 100 makes a number resources available to the client application for performing image processing operations, and that some of these resources can operate concurrently with each other. Specifically, each processing unit (such the CPU or a GPU) can perform computations concurrently with other processing units, while data stored in a memory structure associated with a processing unit can be transferred to another memory structure associated with another processing unit while some or all of the processing units are performing graphics rendering.

Figure 2:
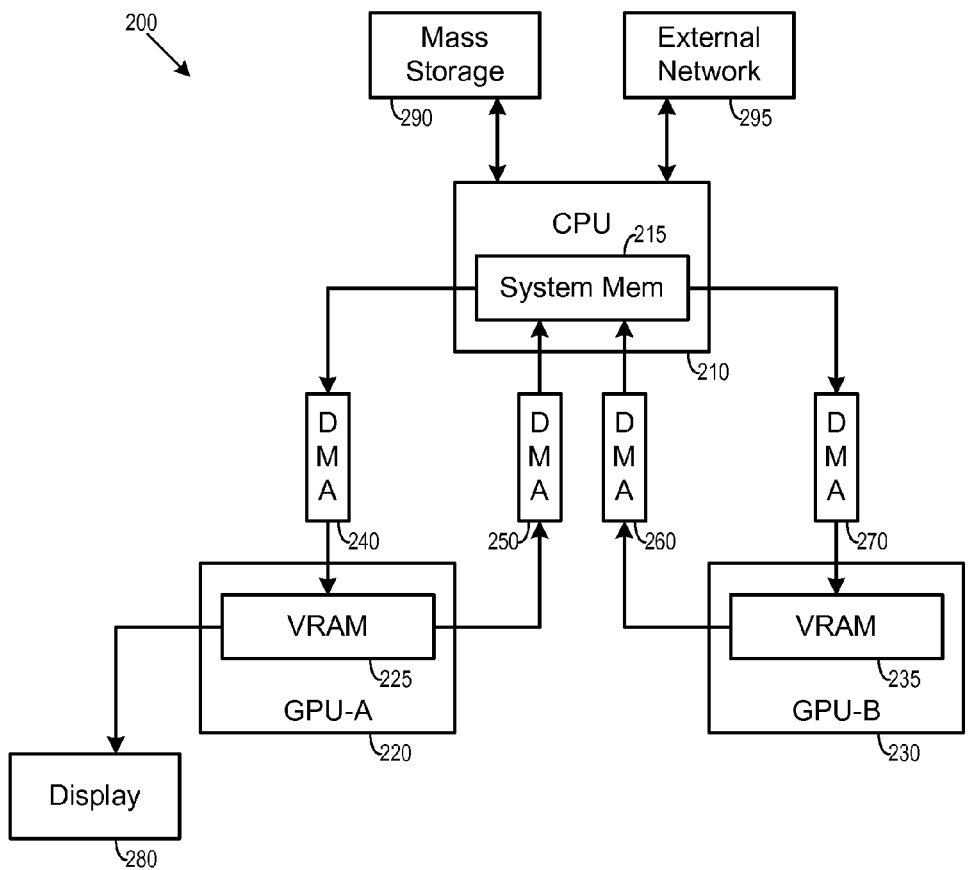
FIG. 2 illustrates a block diagram of an example computer system with concurrent computing resources for rendering and data transport.

FIG. 2 illustrates a block diagram of an example computer system 200 with concurrent computing resources for rendering and data transport. The concurrent computing resources are available to the client application through a media processing stack similar to 100. For some embodiments, FIG. 2 illustrates an encapsulated view of the computing resources as provided by the kernel of the OS (i.e., the resource management layer 140) running on the computer system 200.

As illustrated, the example computer system 200 includes processing units 210 (CPU), 220 (GPU-A), and 230 (GPU-B) 230. The example computer system also includes memory structures 215, 225, and 235 and direct memory access channels (DMAs) 240, 250, 260, and 270. The processing units 210, 220, and 230 can perform operations concurrently with and independently from each other. For example, the GPU 220 can act as a first renderer that execute one set of image processing instructions while the GPU 230 act as a second renderer that executes another set of image processing instruction simultaneously. In some embodiments, the processing units are physically independent devices. In some other embodiments, some of the processing units are virtual devices that are time multiplexed on a fast running computing device. In some embodiments, at least one of the processing units (e.g., the CPU 210) is one of the processing cores inside the central processing unit of the computing system.

Each of the processing units is closely coupled to a memory structure. Specifically, the memory structure 215 is a system memory that is closely coupled with the CPU 210, the memory structure 225 is a VRAM that is closed coupled with the GPU-A 220, and the memory structure 235 is a VRAM that is closely coupled with the GPU-B 230. In some embodiments, a memory structure is closely coupled to a processing unit when the processing unit is able to access the memory structure without having to deferring to another processing unit. In some embodiments, a memory structure is closely coupled to a processing unit when the memory structure is logically, physically, or communicatively in close proximity with the processing unit such as when the memory structure and the processing units are in a same physical device (e.g., in a same integrated circuit, in a same chip package, or in a same graphics card). A memory structure that is closely coupled with a processing unit allows the processing unit to use the memory structure to quickly store and retrieve intermediate computation results. For a processing unit that is performing an image processing job, a memory structure that is closely coupled with the processing unit maintains the output image buffer for the image processing job.

The system memory 215 is a memory structure that is directly accessible to the CPU 210. In some embodiments, the CPU continuously reads and executes instructions stored in the system memory. Any data actively operated on by the CPU is also stored in the system memory. The VRAMs (video RAMs) 225 and 235 are memory structures dedicated to the purpose of holding the information necessary for graphics processing and for to driving a display device. In modern 3D graphics cards, a VRAM may also hold 3D vector data, textures, back buffers, overlays and GPU programs. In the example computing system 200, the VRAM 225 holds data necessary for the image processing operations of GPU-A 200 and the VRAM 235 holds data necessary for the image processing operations of GPU-B. In addition, the VRAM 225 is also driving a display device 280.

The DMAs 240, 250, 260, and 270 are for transferring data between the different memory structures of the computing system 200. Without DMA, the CPU of a computing system has to perform I/O operations in order to transfer data between various hardware subsystems. A DMA (direct memory access) allows the hardware subsystems to directly access memory structures in the computing system independently of the CPU, which frees the CPU from having to perform I/O operations and thus available to perform other work. A DMA to the VRAM of a GPU likewise frees the GPU from having to perform I/O operations for the VRAM, leaving the GPU free to perform rendering or other image processing tasks.

In some embodiments, the device driver sets up the DMA channel's address and count registers together with the direction of the data transfer, then instructs the DMA hardware (e.g., a DMA controller or a processing unit performing DMA functions) to begin the transfer. When the transfer is complete, the DMA hardware interrupts the CPU.

In the example of FIG. 2, the DMA 240 is for directly transferring data from the system memory 215 to the VRAM 225, while the DMA 250 is for directly transferring data from the VRAM 225 to the system memory 215. The DMA 260 is for directly transferring data from the system memory 215 to the VRAM 235, while the DMA 270 is for directly transferring data from the VRAM 235 to the system memory 215. In some embodiments, each DMA corresponds to a physical DMA controller in the computing system 200. In some embodiments, at least some of the DMAs are virtual DMA channels that are implemented by a faster running processing unit via time-multiplexing.

Figure 3A:
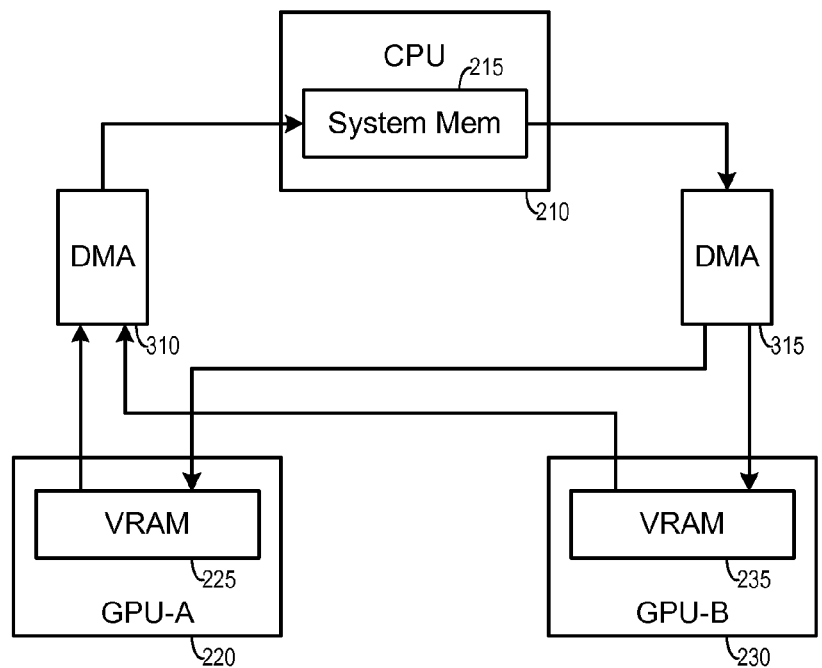
FIG. 3a illustrates an example computing system that includes two unidirectional DMAs.
Figure 3B:
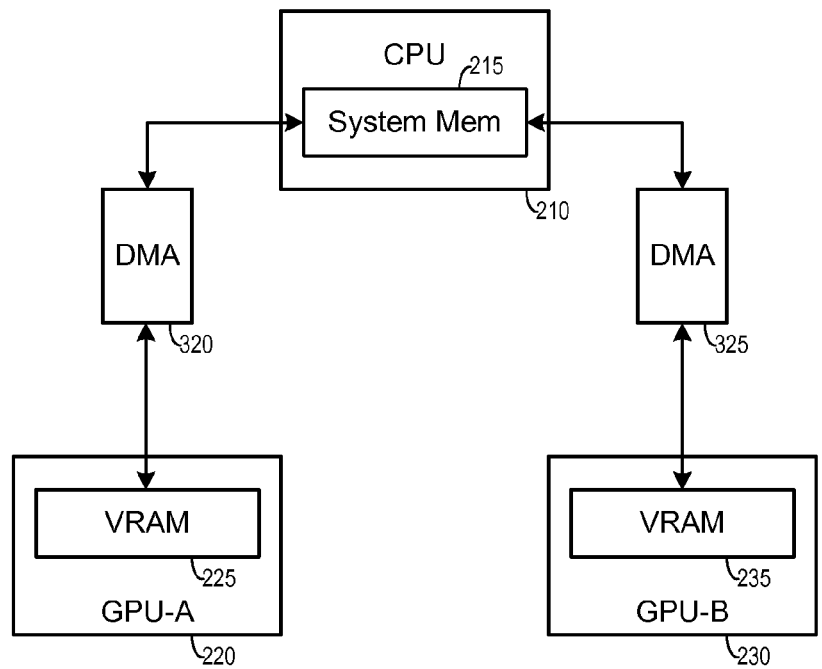
FIG. 3b illustrates an example computing system that includes two bidirectional DMAs.

Different embodiments have different configurations of DMAs. The illustrated example of FIG. 2 includes four unidirectional DMAs, each of these DMAs being only for transferring data between the CPU and a GPU. FIG. 3a illustrates an example computing system that includes two unidirectional DMAs 310 and 315, one for handling data transfers from the CPU 210 to either of the GPUs 220 or 230, and the other for handling data transfer from either of the GPUs to the CPU. In some other embodiments, some or all of the DMAs are bidirectional. FIG. 3b illustrates an example in which a first bidirectional DMA 320 handles the data transfer between the system memory 215 and the VRAM 225 of GPU-A, and a second bidirectional DMA 325 handles the data transfer between the system memory 215 and the VRAM 235 of GPU-B. In some other embodiments, DMAs are not limited to data transfers between the CPU and one of the GPUs. In some of these embodiments, the computing system includes a DMA for handling data transfer from VRAM to VRAM directly (not illustrated).

The DMAs allow data from a memory structure that is closely associated with one processing unit to be transferred to another memory structure that is closely associated with another processing unit without using either of the processing units or the CPU. For example, to transfer data generated by the CPU 210 to be processed by the GPU-B 230, the DMA 270 is set up to transfer data from the system memory 215 (which is closely coupled to the CPU 210) to the VRAM 235 (which is closely coupled to the GPU-B 230) without blocking or slowing down the operations taking place within the CPU 210 or the GPU-B 230. This data transfer is necessary because data generated by the CPU is stored in the system memory 215 and cannot be readily accessed and processed by GPU-B unless the data is copied to the VRAM 235 (since the VRAM 235 is closely coupled with the GPU-B).

For some embodiments, data transfer operations between the memory structures of the different processing units is necessary because the memory structures as well as the processing units often have unique roles within the computing system. For example, the VRAM 225 of GPU-A 220 is the video memory that is directly driving the display device 280, therefore the output buffers of all rendering jobs being performed on GPU-B 230 or the CPU 210 must be transferred to the VRAM 225. As a further example, the CPU 210 controls the data input/output with the mass storage 290 (e.g., a hard drive) or the external network 295 (e.g., WiFi or Ethernet) as illustrated. In order to have either the GPU 220 or the GPU 230 perform rendering operations based on data located in the mass storage 290 or the external network 295, data stored therein must be copied from the system memory 215 to either the VRAM 225 or the VRAM 235.

Figure 4:
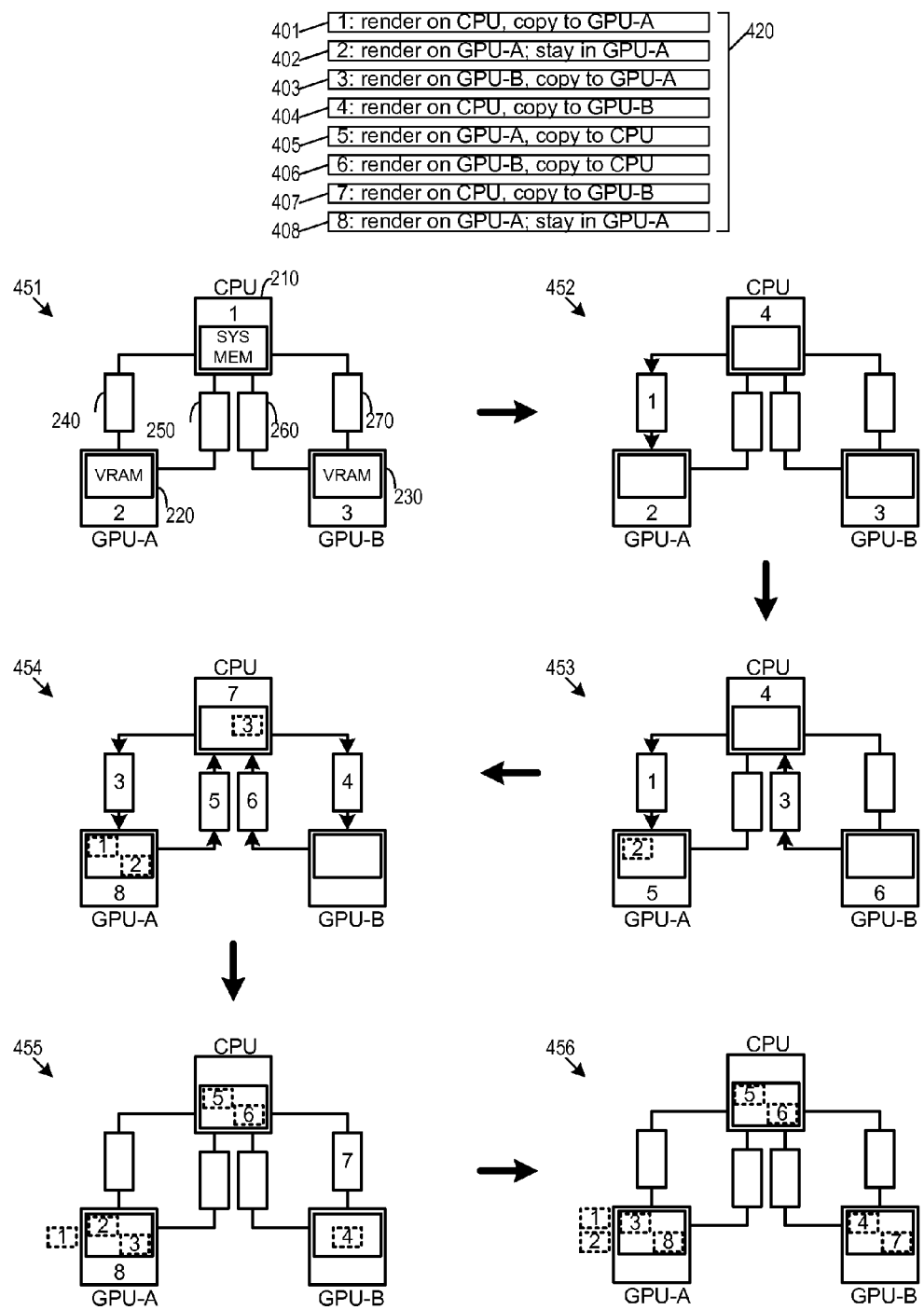
FIG. 4 illustrates concurrent rendering and data transfer operations.

FIG. 4 illustrates concurrent rendering and data transfer operations that take place in the computing system 200. The example illustrates a series of incoming rendering jobs, each rendering job specifying a rendering resource for performing rendering operations and a destination resource for sending the output of the rendering job to. The processing units (CPU and GPUs) will perform the rendering jobs, and the DMAs will transfer the outputs of the rendering jobs to their destinations. The figure illustrates how these concurrent computing resources perform concurrent rendering and data transferring operations.

FIG. 4 illustrates a series of rendering job 401-408. FIG. 4 also illustrates the computing system 200 performing the series of rendering jobs 401-408 in six stages 451-456. The rendering jobs 401-408 have no logical dependencies with each other and can be executed concurrently. Before the first stage, the processing units (CPU 210, GPU-A 220, GPU-B 230) and the DMAs are idle and available to perform operations.

At the first stage 451, the rendering jobs 401, 402, and 403 are assigned to CPU, GPU-A, and GPU-B respectively. In some embodiments, the client application can specify or prefer a rendering resource for performing a rendering job, and the job management layer (e.g., 130) will assign a job to the specified (or preferred) rendering resource if possible. In this instance, job 401 chooses the CPU for rendering, job 402 chooses GPU-A for rendering, and job 403 chooses GPU-B for rendering. Since all three processing units are idle, all three jobs immediately proceed to execution. Remaining rendering jobs 404-408, on the other hand, will have to wait for at least one of the processing units to become available.

At the second stage 452, the GPU-A and GPU-B are still rendering jobs 402 and 403 respectively, while the CPU has completed rendering job 401 and started rendering job 404. In addition to choosing a processing unit as the rendering engine, the job 401 also specifies that the output of the rendering job is to be copied to GPU-A (i.e., the VRAM of GPU-A). As a result, the DMA 240, which is setup for transferring data from the system memory of the CPU to the VRAM of GPU-A, is delivering the resulting output buffer from the rendering job 401 to GPU-A. This data transfer operation does not block or slow down the operations that are taking place in GPU-A (which is still rendering job 402) and the CPU (which is now performing the rendering job 404).

At the third stage 453, GPU-A has completed job 402. Job 402 specifies that its output buffer shall remain with GPU-A (as illustrated by dashed box labeled "2") and therefore DMAs are not needed for data transfer. GPU-B has completed job 403, which chooses GPU-A to be destination of its output. Since there is no DMA channel directly linking the GPU-A and GPU-B, the output buffer of render job 403 must be copied to the system memory via DMA 260 (from GPU-B to system memory) and DMA 240 (from system memory to GPU-A). The DMA 260 is therefore illustrated as transferring the output buffer of the rendering job 403 from the VRAM of GPU-A to the system memory as the first leg of the data transfer operation. In the meantime, GPU-A has started working on a rendering job 405 and GPU-B has started working on rendering job 406. The CPU is still rendering job 404, and the DMA 240 is still transferring the output buffer of the job 401 to the VRAM of GPU-A.

At the fourth stage 454, the DMA 240 has finished copying the output buffer of job 401 to the VRAM of GPU-A (as illustrated by dashed box labeled '1'). The CPU has finished job 404 and started on a new job 407. GPU-A has likewise finished job 405 and started job 408. GPU-B has finished job 406, but since there is no more job in the queue, GPU-B becomes idle. The output buffer of job 404 is on its way from the system memory to the VRAM of GPU-B via the DMA 270, the output of the job 405 is on its way from the VRAM of GPU-A to the system memory via DMA 250, and the output of the job 406 is on its way from the VRAM of GPU-B to the system memory via DMA 260. The output buffer of the job 403 has been copied to the system memory (illustrated by dashed box labeled "3"), and the DMA 240 is in turn copying this output buffer to VRAM of GPU-A as the second leg of the data transfer operation for the job 403. Since these data transfer operations are handled by DMAs, the processing units are left free to perform other tasks.

At the fifth stage 455, the output buffers of the jobs 403, 404, 405, and 406 have all been transferred to their respective destination memory structures (illustrated by dashed boxes labeled '3', '4', '5', and '6' in the VRAMs and the system memory). The CPU has completed rendering job 407, and the DMA 270 is transferring its output buffer to VRAM of GPU-B. GPU-A is still processing job 408 while the CPU has become idle.

At the last stage 456, GPU-A has finished the rendering job 408. Since rendering job 408 specifies that its output is to stay in the VRAM of GPU-A (illustrated by dashed box labeled '8'), its output need not be copied elsewhere by DMA. All of processing units and DMAs are now idle.

Figure 5:
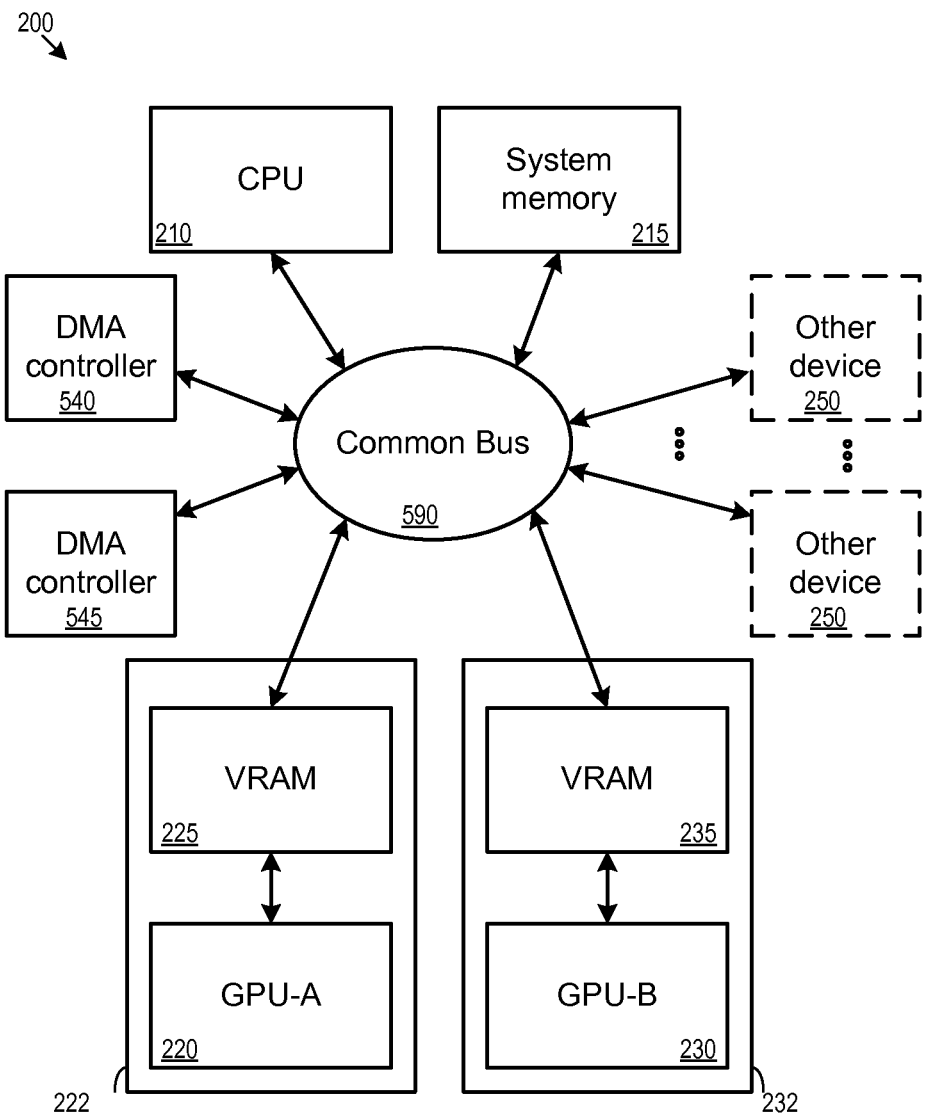
FIG. 5 illustrates an example physical layer hardware configuration for the concurrent computing resources.

FIGS. 2-4 illustrates the relationships between the concurrent computing resources (processing units and the DMAs) from the point of view of the client application through the kernel and the device drivers in the resource management layer. In order for the client application to use the concurrent computing resources in the configurations shown in FIG. 2, the kernel of the operating system and the device drivers must interact with the actual physical layer hardware components sitting at the bottom of the media processing stack. FIG. 5 illustrates an example physical layer hardware configuration for the concurrent computing resources of FIG. 2.

FIG. 5 illustrates the physical components of the computing system 200, which includes CPU 210, system memory 215, GPU-A 220, GPU-B 230, VRAMs 225 and 235, DMA controllers 540 and 545, and other devices 250. The VRAM 225 is closely coupled with GPU-A 220 within a same graphics device 222. The VRAM 235 is closely coupled with GPU-B 230 within a same graphics device 232. The CPU 210, the system memory 215, the DMA controllers 540 and 545, graphics devices 222 and 232, and other devices 250 are communicatively coupled by a common bus structure 590.

The common bus 590 is a high throughput communications medium for transferring data between hardware devices that are connected to it. The different rendering resources or processing units (i.e., CPU 210, GPU-A 220, and GPU-B 230) as well as their memory structures are interconnected by the common bus structure 590. In some embodiments, the common bus structure 590 is implemented by a bus that is shared by the different components according to a standardized protocol such as PCI local Bus®. In some embodiments, the common bus structure is a high throughput serial bus such as USB®, or PCI Express®. In some of these embodiments, the different components connect to a central host or root complex through separate serial links in a point-to-point topology.

As mentioned, some memory structures and processing units are "closely coupled" with each other. In some embodiments, a processing unit is closely coupled with a memory structure if the processing unit can directly access the memory structure by its own electrical connection without going through a common bus structure that is shared with other processing units. For example, as illustrated by FIG. 5, a processing unit such as the GPU-A 220 is closely coupled with the VRAM 225 because GPU-A can directly access the VRAM 225 through its own electrical connections to the VRAM without going through the common bus structure 590. On the other hand, the CPU 210 (or GPU-B) is not closely coupled with VRAM 225, because the CPU 210 does not have its own electrical connection with the VRAM 225. The CPU 210 can only access the VRAM 225 through the common bus structure 590.

The DMA controllers 540 and 545 are physical devices that provides the DMA functions as described above by reference to FIGS. 2-3. FIG. 5 illustrates two DMA controllers, but some embodiments include only one DMA controller or more than two DMA controllers. A DMA controller is a physical device that, through the common bus structure 590, controls the data transfer operations between memory structures that are coupled to the common bus 590. A DMA controller, once setup by the CPU 210, would automatically perform memory access operations to move data from a source memory structure to a destination memory structure, leaving processing units in the system (CPU and GPUs) free to perform other operations such as graphics rendering. In some embodiments, at some of the DMA controllers are hardware devices dedicated to performing direct memory access operations. In some embodiments, at some of the DMA controllers are virtual DMA controllers mapped to processing threads of one or more fast-running processing units.

In order to facilitate the transfer of data such as image buffers from memory structure to memory structure, some embodiments map the different memory structures to one contiguous address space. In some embodiments, this contiguous address space is referred to as the kernel address space since this is the address space that is maintained by the kernel of the operating system through the device drivers.

Figure 6:
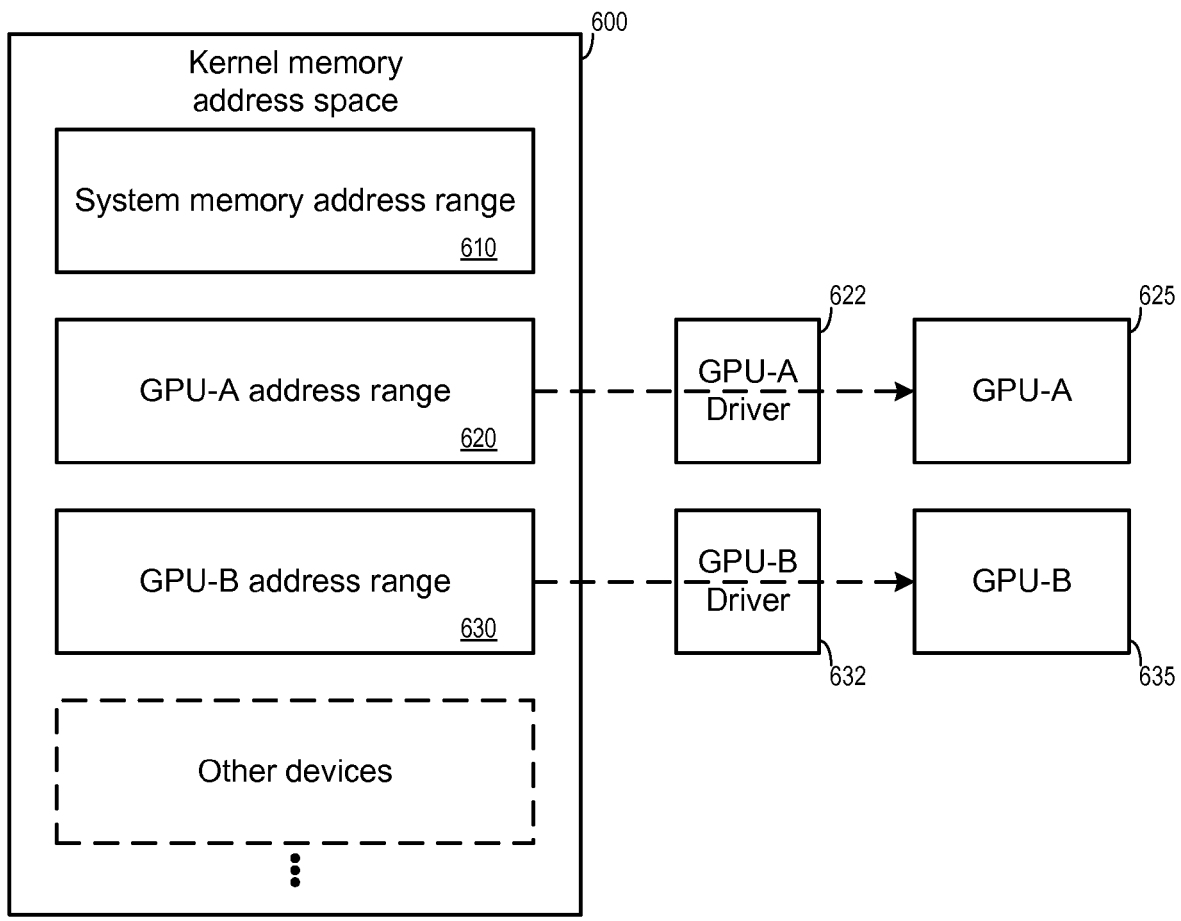
FIG. 6 conceptually illustrates a kernel memory address that is mapped to the various physical memories of computing system.

For some embodiments, FIG. 6 conceptually illustrates a kernel memory address that is mapped to the various physical memories of computing system. FIG. 6 illustrates a kernel memory address space of an operating system that maps the system memory, the VRAMs of the GPUs, and other memory structures accessible to the operating system to one contiguous address space 600. As illustrated, the address space 600 includes address range 610 for the system memory, address range 620 for the VRAM of the GPU-A, address range 630 for the VRAM of GPU-B, and other address ranges for other devices. Some portions of the kernel address space 600 are not mapped to any physical device, but are available for use by further expansions for additional devices.

Though the system memory and the VRAMs of GPUs are physically different devices that each has its own peculiar requirements and addressing schemes, the kernel and the device drivers makes these different devices appear as virtual address ranges in one same memory structure to the media processing stack. For example, as illustrated, the device driver 622 for the GPU-A allows the client application to address the physical device 625 of GPU-A by simply using address range in the address range 620, and the device driver 632 for the GPU-B allows the client application to address the physical device 635 of GPU-B by simply using address range in the address range 630. As a result, when setting up a DMA channel for transferring data from say, the system memory to the VRAM of GPU-B, the routines in the media processing stack (i.e., the routines in the job management layer and the resource management layer) can use the virtual address ranges for the system memory (610) and GPU-B (630) to set up the DMA channel.

Figure 7A:
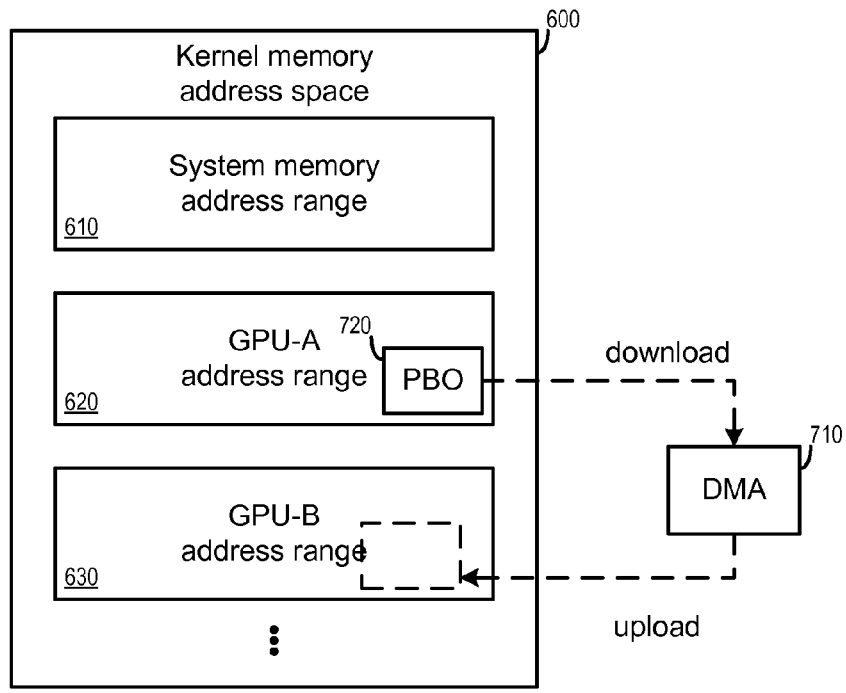
FIGS. 7a-b illustrate the use of the virtual address ranges in the kernel address space for performing direct memory access operations to transfer blocks of image data.
Figure 7B:
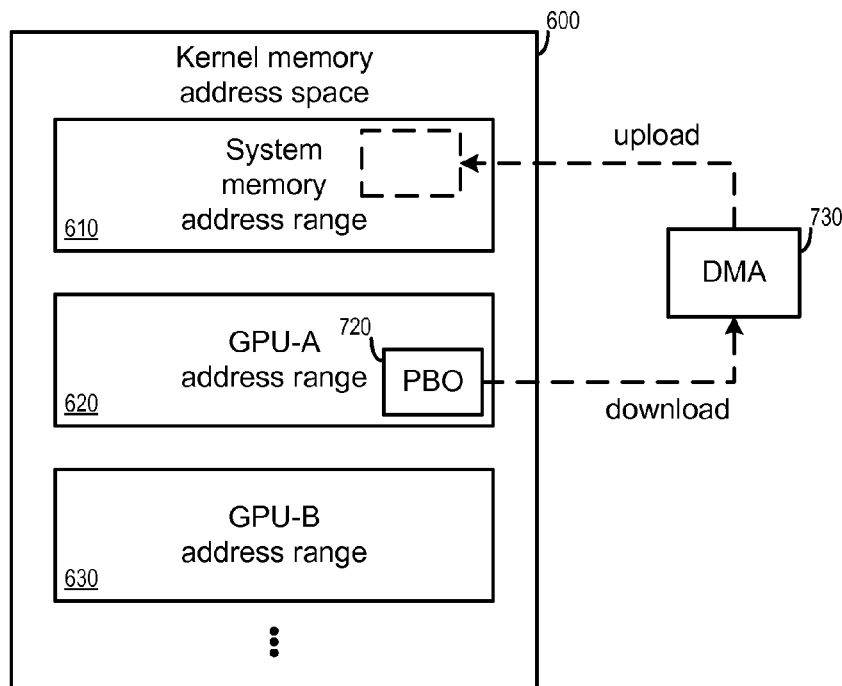

FIGS. 7a and 7b illustrate the use of the virtual address ranges in the kernel address space 600 for performing direct memory access operations to transfer blocks of image data. Some of these blocks of image data are bitmaps that are retrieved or created by the CPU. Some are the outputs of image processing or rendering jobs, known as PBOs (pixel buffer objects). PBOs are produced by the rendering engines as they perform the rendering jobs. DMA operations then transfer these PBOs or bitmaps to their specified destinations.

FIG. 7a illustrates a DMA channel 710 that uses the kernel address space 600 to transfer PBO 720 from the VRAM of GPU-A to the VRAM of GPU-B. The DMA 710 is given a block of address space in the address range 620 (for GPU-A) that correspond to the location of the PBO 720, and a destination address in the address range 630 for the PBO to be copied to in the VRAM of GPU-B. FIG. 7b illustrates a DMA channel 730 that uses the kernel address space 600 to transfer PBO 720 from the VRAM of GPU-A to the system memory. The DMA 730 is given a block of address space in the address range 620 (for GPU-A) that correspond to the location of the PBO 720, and a destination address in the address range 610 for the PBO to be copied to in the system memory.

II. Managing Concurrent Jobs

In some embodiments, image processing operations are divided by the media processing stack into individual rendering jobs to be performed concurrently across different computing resources. In order to fully utilize the concurrent processing capabilities of the physical hardware, the job management layer sets up different storage queues for different types of jobs. The job management layer also includes routines to select jobs from the queues and to assign the selected jobs to processing threads of the different resources.

In some embodiments, the client application uses the image processing framework layer to generate the render graphs, and the job management layer then stores the graphs in a rendering queue. These stored graphs are retrieved by a renderer selection engine in the job management layer, before being passed to one of the available renderers (i.e., CPU or GPUs). In some embodiments, the selection of a particular renderer is made by the client application, and this selection is passed to the renderer selection engine. In other embodiments, the renderer selection engine determines which renderer should be used based on various criteria (e.g., resource availability, resource usage, etc.).

Depending on what resource is used to do the rendering job, the result may not be stored/buffered in a location desired by the client application, so there is additional work to get the result to the desired output destination. In some embodiments, the client application simply indicates a resource option and where the end result is to be output, and the job management layer automatically creates a secondary job to facilitate the client's request. In other words, the client application is not required to manage where the result is to end up or create the secondary job. For example, if the client application specifies any resource but wants the result to end up on GPU-A, the queuing system may render on GPU-B and then create a secondary job to copy from the output buffer of the render job form GPU-B to GPU-A.

Figure 8:
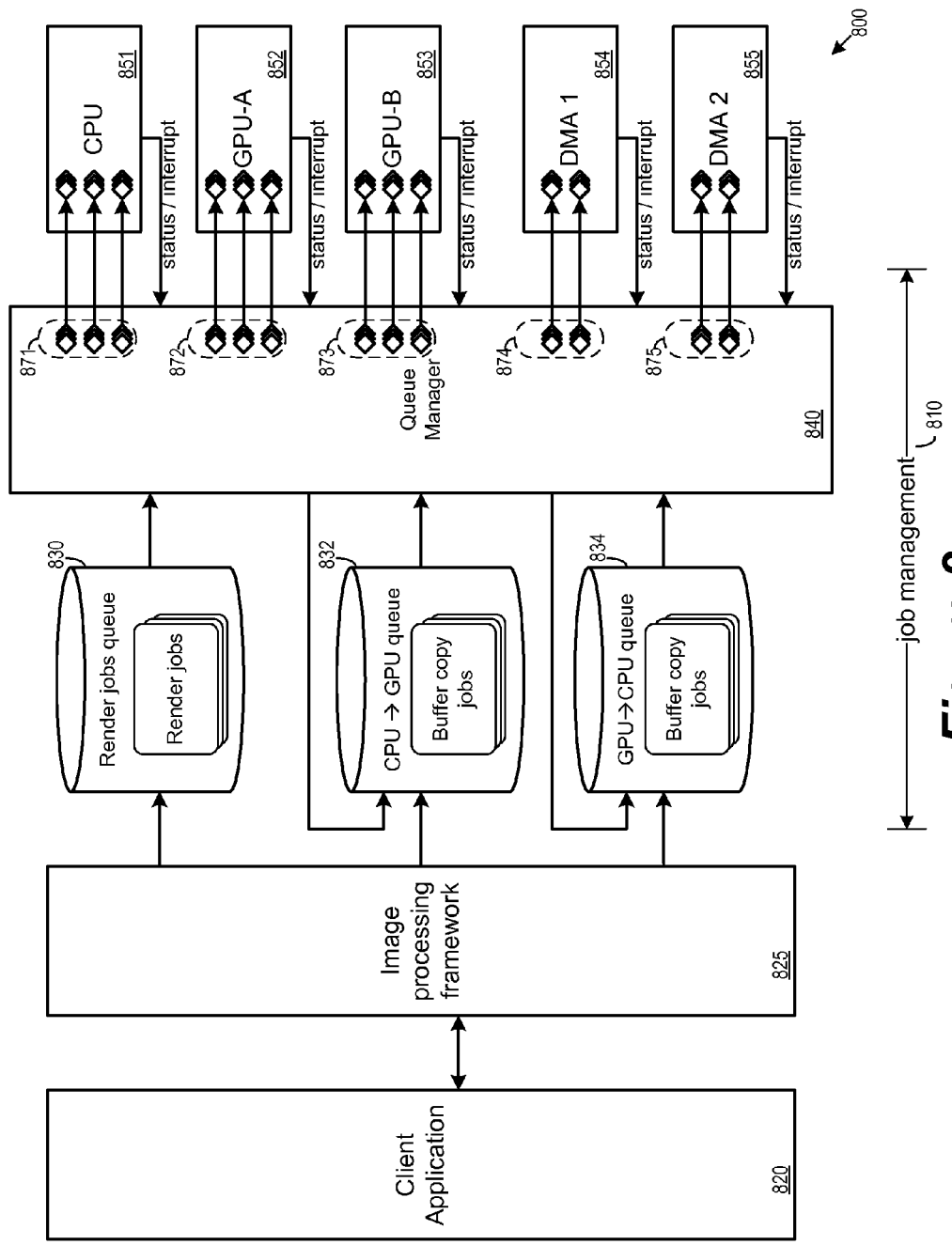
FIG. 8 conceptually illustrates a computing system in which a job management sub-system creates multiple queues for receiving different types of jobs and for assigning these jobs to be executed concurrently by multiple computing or rendering resources.

FIG. 8 conceptually illustrates a computing system 800 in which a job management sub-system creates multiple queues for receiving different types of jobs and for assigning these jobs to be executed concurrently by multiple computing or rendering resources. The job management sub-system also creates secondary jobs and assigns these secondary jobs to DMA channels for transferring output data (such as PBOs) to their intended destinations.

As illustrated, the computing system 800 includes a job management sub-system 810, which receives rendering jobs created by the client application 820 through the use of the image processing framework 825. The job management layer 810 assigns these received render jobs to rendering resources such as CPU 851, GPU-A 852, and GPU-B 853. The job management layer 810 also creates and assigns data transfer jobs to DMA channels 854 and 855. The job management layer 810 creates and maintains a render jobs queue 830, a CPU to GPU jobs queue 832, and a GPU to CPU jobs queue 834. The job management layer 810 includes a queue manager 840 for selecting jobs from these different queues.

In some embodiments, each of the job queues 830, 832, and 834 keeps track of the order by which the jobs enter the queue. In other words, the jobs in the queues are organized in a first-in, first-out (FIFO) manner. In some embodiments, jobs are prioritized such that the jobs with higher priorities are selected for execution before jobs with lower priorities. However, if there are multiple highest priority jobs that are all equally suitable for execution by a particular available computing resource, the job that was the earliest to enter the queue will be selected first.

The queue manager 840 supports dedicated worker threads for each of the computing resources. Some embodiments specify a number of worker threads (or work units) per computing resource along with the type of jobs that each worker thread will perform during the initial setup of the queuing system. This creates a pool of available worker threads within the queuing system that are assigned to a specific compute resources for performing specific types of jobs (e.g. renders and buffer copy jobs). In the example illustrated in FIG. 8, three worker threads 871 are dedicated to the CPU 851, three worker threads 872 are dedicated to the GPU-A 852, three worker threads 873 are dedicated to the GPU-B 853, two worker threads 874 are dedicated to the DMA channel 854, and two worker threads 875 are dedicated to the DMA channel 855.

In some embodiments, a computing resource services its multiple worker threads in a time-multiplexed fashion. In some embodiments, computing resources having multiple processing units (such a CPU with multiple processing cores) would have each of its multiple worker threads assigned to one of the multiple processing units. In some embodiments, the queue manager dispatches suitable jobs from the queues to worker threads 871-875 for execution on the computing resources. In some embodiments, worker threads 871-875 select suitable jobs from the queues for execution on the computing resources.

The queue manager 840 also receives a set of status or interrupts from the computing resources. In some embodiments, the resources use these statuses and interrupts to inform the queue manager 840 whether a particular job has finished, what percentage of the job has been completed, which worker thread is idle/busy, etc. For example, in some embodiments, a rendering computing resource such as GPU-A or B provides status to the queuing manager on each rendering job, and a DMA channel generates an interrupt whenever it has completed transferring a PBO to its destination. The queue manager uses these statuses and interrupts in order to determine which computing resource is available and to decide which computing resource to assign the next selected job from one of the queues. In some embodiments, the queue manager 840 also creates buffer copying jobs for a rendering job if the destination of the rendering job is not the same as the computing resource that perform the rendering. In some embodiments, the created buffer copying job are stored in CPU to GPU jobs queue 832 (if the required copying is from the CPU to one of the GPUs) or the GPU to CPU jobs queue 834 (if the required copying is from one of the GPUs to the CPU). The operations of the queue manager will be further described below by reference to FIGS. 10-13.

Figure 9:
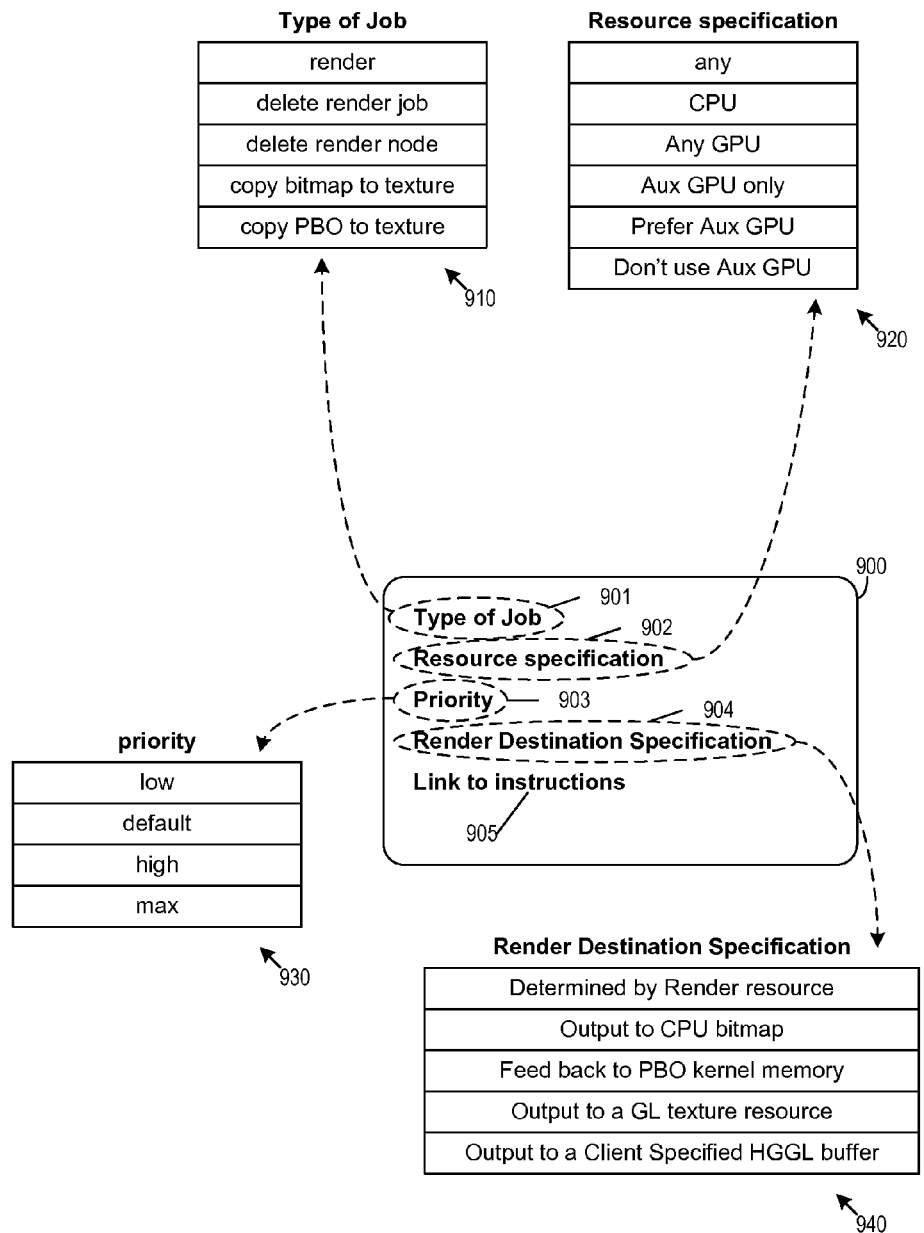
FIG. 9 illustrates an example job generated by a client application and stored in one of the jobs queues.

Each job entering a queue has several user specified parameters, based on which the queue manager selects a computing resource for performing the job and where to move the output of the job. FIG. 9 illustrates an example job 900 generated by a client application and stored in one of the jobs queues (such as 830, 832, or 834). The job 900 includes several parameters 901-905 specified by the client application, including a job type 901, a resource specification 902, a priority specification 903, a destination specification 904, and a link to instructions 905. The link 905 can be a link to a set of instructions for performing one or a series of image processing tasks such as rendering, shading, or other image processing algorithms. The link 905 can also be a link to a set of instructions for a DMA transfer operation (e.g., by specifying a start address in a source memory location, a start address in a destination memory location, and a size of transfer).

The parameter 901 specifies the type of job for the job 900. A client specified job can be one of several types. The figure includes a list 910 that includes several example job types. The list 910 includes job types for graphics rendering jobs (such as "render") that are to be assigned to one of the rendering computing resources (CPU or GPUs). The list 910 also includes jobs types for data transfer operations (such as "copy bitmap to texture" and "copy PBO to texture") that can either be performed a DMA channel or a processing unit. The list 910 further includes commands for queue management (such as "delete render job" and "delete render node"). One of ordinary skill would realize that this list of example job types is not exhaustive, and that many other job types are possible for image processing operations and other types of operations.

The parameter 902 is the resource specification for selecting a computing resource for performing the job 900. The figure includes a list 920 that includes several example resource specifications. The list 920 includes resources specification in which user specifies that the job can only be performed on a particular computing resource (such as "CPU", "aux GPU only") or a particular class of computing resources (such as "any GPU", "don't use aux GPU"). The list 920 also includes resource specifications in which the client application states its preference for a computing resource or a particular type of computing resource (such as "prefer aux GPU"), but the job can be assigned to other resources if the preferred resource is not available. The list

920 also includes resource specification in which the client application makes no specification at all and leaves it to the job management layer to decide which computing resource to use (such as "any"). When the client application makes no resource specification, some embodiments use the first available computing resource to facilitate full load balancing across all resources.

The parameter 903 specifies the priority level of the job 900. In some embodiments, this parameter determines whether the job 900 will be selected for execution before other jobs in the queue. The figure includes a list 930 that includes several example priority levels. For example, maximum priority job has a priority level "max", while low priority jobs such as background job has a priority level "low". Jobs that are important but not necessarily urgent has priority level "high". Jobs for which the client application has no specific priority requirement have a "default" priority. In some embodiments, each priority level is assigned a numerical value. For example, the "max" priority has the highest numerical value, while the "low" priority has a numerical value that is lower than the "high" priority. The default priority has a numerical priority value that is determined by the operating system. Some embodiments set this value to be between the numerical values for "low" and "high". Some embodiments set this value dynamically based on real-time operational conditions.

The parameter 904 specifies the destination for the rendering job 900. The figure includes a list 940 that includes several example destination specifications. Based on the destination specification, the job management layer decides which kernel memory location to move or copy the result of the job 900 to. If the destination kernel memory location does not reside with the computing resource that performs the rendering job, some embodiments create a DMA transfer job that sends the output of the job from one memory structure to another.

One of ordinary skill would realize that lists 910, 920, 930, and 940 are not exhaustive, and that a client application in some embodiments can make many other specifications with regard to resource, priority, job type, and job output destination.

Figure 10:
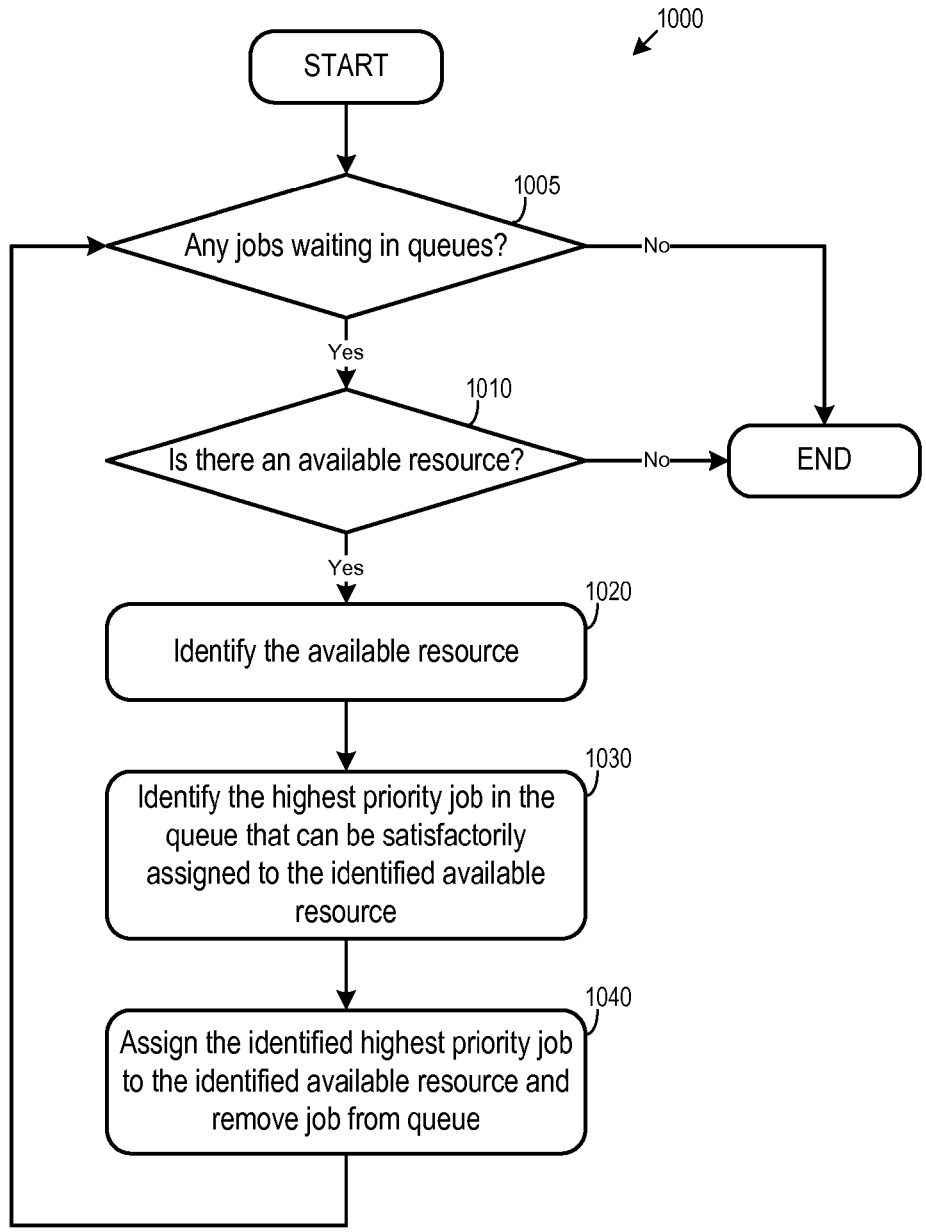
FIG. 10 conceptually illustrates a process for selecting a job from a queue and for assigning the selected job to a computing resource.

Based on these job parameters, the job management layer decides which job to select from the queues and which computing resource to assign the selected job to for execution. FIG. 10 conceptually illustrates a process 1000 for selecting a job from a queue and for assigning the selected job to a computing resource. Some embodiments perform the process 1000 for selecting a render job from the rendering jobs queue (e.g., 830) for execution on a rendering engine. Some embodiments perform the process 1000 for selecting a job from one of the buffer copying queues (e.g., 832 or 834) for execution on a DMA channel.

Upon start, the process 1000 determines (at 1005) whether there are jobs in any of the jobs queues that need to be assigned to a computing resource for execution. If there are jobs in the queues waiting to be executed, the process proceeds to 1010. Otherwise, the process ends. Some embodiments automatically repeat the process 1000 after it ends in order to continuously monitor the jobs queues as well as the status of the computing resources.

Next, the process determines (at 1010) whether there is an available computing resource. In some embodiments, the process polls the status of the various computing resources to determine if any of them are available to handle a new job from the queues. In some embodiments, the process makes this determination based on interrupt signals issued by at least some of the computing resources. Some embodiments consider a computing resource as available as long as there is sufficient processing bandwidth remaining to handle some of the worker threads from the new job. If all of the computing resources are busy and cannot handle a new job, the process 1000 ends. Otherwise, the process proceeds to 1020. Some embodiments automatically repeat the process 1000 after it ends in order to continuously monitor the jobs queues as well as the status of the computing resources.

The process identifies (at 1020) the available resource and identifies (at 1030) the highest priority job in the queue(s) that can be satisfactorily assigned to the identified available resource. For each identified available resource, the job management layer identifies the highest priority job that is allowed to operate on that available resource. In some embodiments, this identification is according to the resource specifications and the priority specifications of the jobs in the queues. Specifically, some embodiments consider assigning a higher priority job to the available computing resource before a lower priority job, but only if the available resource is acceptable to the higher priority job. A process for identifying a job for assignment to an available resource is described by reference FIG. 11 below.

Having identified a job for the available resource, the process 1000 then assigns (at 1040) the identified highest priority job to the available resource for execution and remove the job from queue. Once the job has been assigned, the process returns to 1005 to see if there are more jobs waiting in queues.

As discuss above by reference to FIG. 9, some embodiments allow the upper layer programs of the media processing stack to make resource specifications. An upper layer program (such as the client application) can specify, prefer, or eschew a particular computing resource or a particular class of computing resources. The client can specify a specific resource to use (e.g., "CPU", "aux GPU only") such that the job can only be performed at that specific resource or that specific class of resources. The client can specify a preferred resource (e.g., "prefer aux GPU"). For example, if a particular resource is connected to the display and that is where the result will be rendered, then the client would prefer that particular resource. However, if the rendering operation is a background job, then the client may not prefer a primary resource (e.g., a GPU that is connected to the display), which is likely needed for higher priority jobs. In these instances, the client application may instead prefer a secondary resource (e.g., a GPU that is not connected to the display). The client can also specify that any resource may be used to perform the job (e.g., "any"). In some embodiments, the job management layer would assign such jobs to computing resources so to facilitate full load balancing across all resources.

Figure 11:
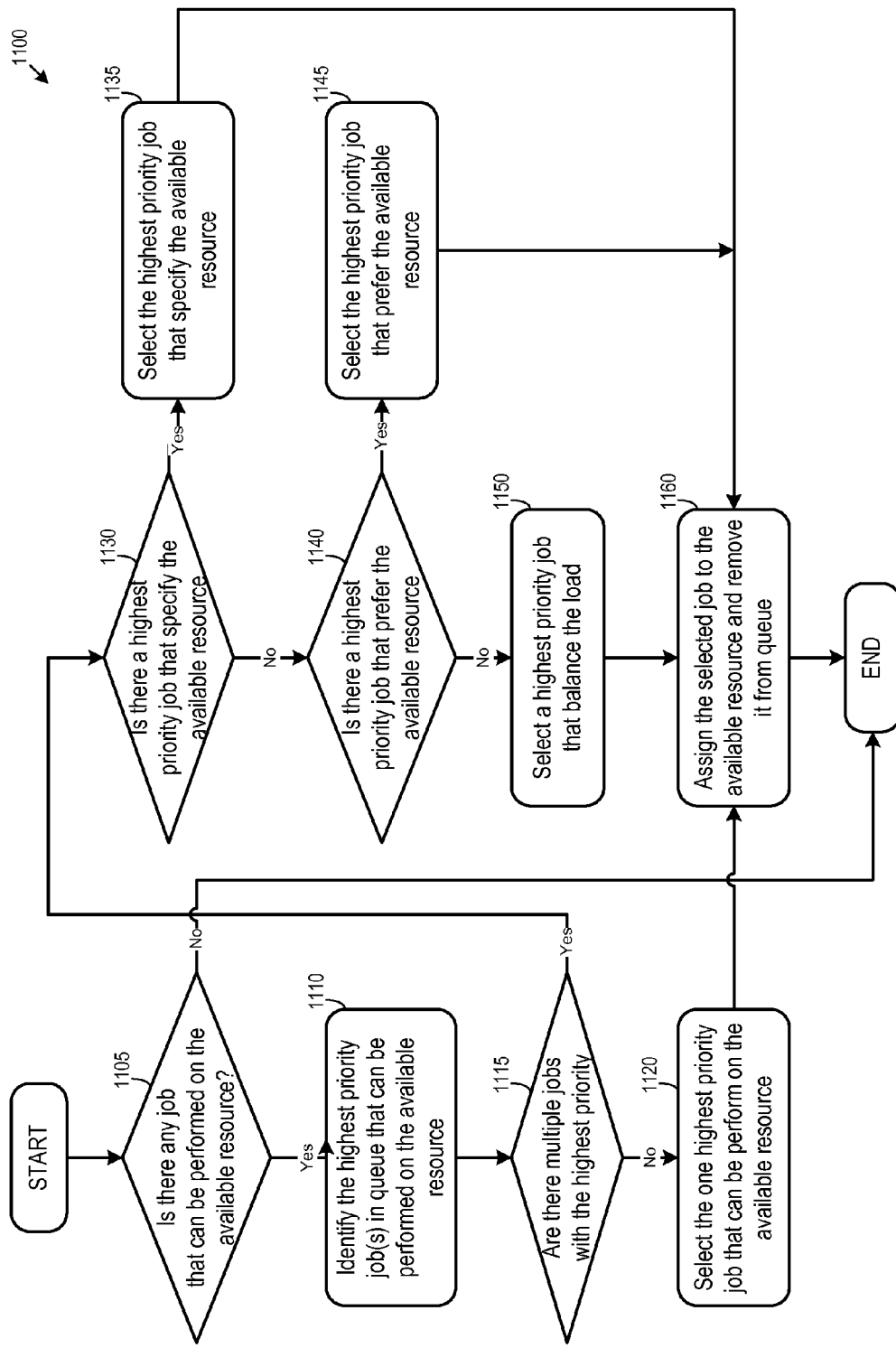
FIG. 11 conceptually illustrates a process for identifying a job for an available resource based on the job's resource specification and priority level.

For some embodiments, FIG. 11 conceptually illustrates a process 1100 for identifying a job for an available resource based on the job's resource specification and priority level. In some embodiments, this process is performed during the operation 1030 of the process 1000. The process 1100 starts whenever the job management layer has identified at least one available computing resource (i.e., operations 1010 and 1020 of the process 1000).

The process starts by determining (at 1105) whether there is any job that can be performed on the available resource. If there is at least one job in the queue that can be performed on the identified resource, the process proceeds to 1110. Otherwise, the process 1100 ends without assigning any job to the identified available resource.

The process identifies (at 1110) the highest priority job or jobs in the queue that can be performed on the identified available resource. The process can assign a job to the identified available resource if the job's resource specification specifies the identified resource, prefers the identified resource, prefer another resource but can be executed on the identified resource, or can be executed on any resource. The process can also assign a job to the identified available resource if the resource specification does not specify another resource or eschew the identified available resource. The operation 1110 does not identify a job unless it can be executed on the identified available resource, even if its priority is higher than all other jobs in the queue.

Next, the process determines (at 1115) whether there are multiple highest priority jobs that can be performed on the identified available resource. If there are multiple jobs with the highest priority that can all be performed on the identified available resource, the process proceeds to 1130. If there is only one highest priority job that can be performed on the identified available resource, the process proceeds to 1120.

At 1120, the process selects the only one highest priority job that can be performed on the available resource. The process then assigns (at 1160) the selected job to the available resource for execution and removes the job from queue.

If there are multiple jobs with the highest priority that can be performed on the identified available resource, the process determines (at 1130) whether there is a highest priority job that specifies or requires the available resource. In some embodiments, when there are multiple jobs with equal priority that can be performed on the same available computing or rendering resource, the job that has to be run on that resource will be assigned first. If none of the highest priority jobs specify the available resource, the process proceeds to 1140. Otherwise, if there is at least one highest priority job that specifies the available resource, the process proceeds to 1135.

At 1135, the process selects one of the highest priority jobs that specify the available resource. In some embodiments, the job queues are both prioritized and first-in, first-out (FIFO). Thus, if there are multiple highest priority suitable jobs in a queue, the process would identify the job that was the earliest to enter the queue.

The process then assigns (at 1160) the selected job to the available resource for execution and removes the job from queue. If none of the highest priority jobs specifies the available resource, the process determines (at 1140) whether there is a highest priority job that prefers the available resource. If none of the highest priority jobs prefers or specifies the available resource, the process proceeds to 1150. Otherwise, if there is at least one highest priority job that prefers the available resource, the process proceeds to 1145.

At 1145, the process selects one of the highest priority jobs that prefer the available resource. The process then assigns (at 1160) the selected job to the available resource for execution and removes the job from queue.

If none of the jobs specify or prefer the identified available resource, the process selects (1150) a highest priority job that balances the load. Some embodiments check the status of each individual computing resource in order to determine how busy each computing resource is. Some embodiments distribute jobs as evenly as possible. It is worth noting that, at this point of the process 1100, only jobs that can be executed on the available resource are identified, therefore, there is at least one highest priority job that can execute on the available computing resource. Such a job may prefer another computing resource but find the identified available acceptable, or may not have any resource specification at all. The process then assigns (at 1160) the selected job to the available resource for execution and removes the job from queue. After assigning the selected job to the identified available resource and removing the job from queue, the process 1100 ends.

The processes 1000 and 1100 described above are operations performed by the queuing manager of some embodiments when it act as a central dispatcher of jobs from the job queues to the available computing resources. In some embodiments, the queue manager, instead dispatching jobs centrally, relies on individual worker threads (or work units) to select jobs from the queues for execution.

Figure 12:
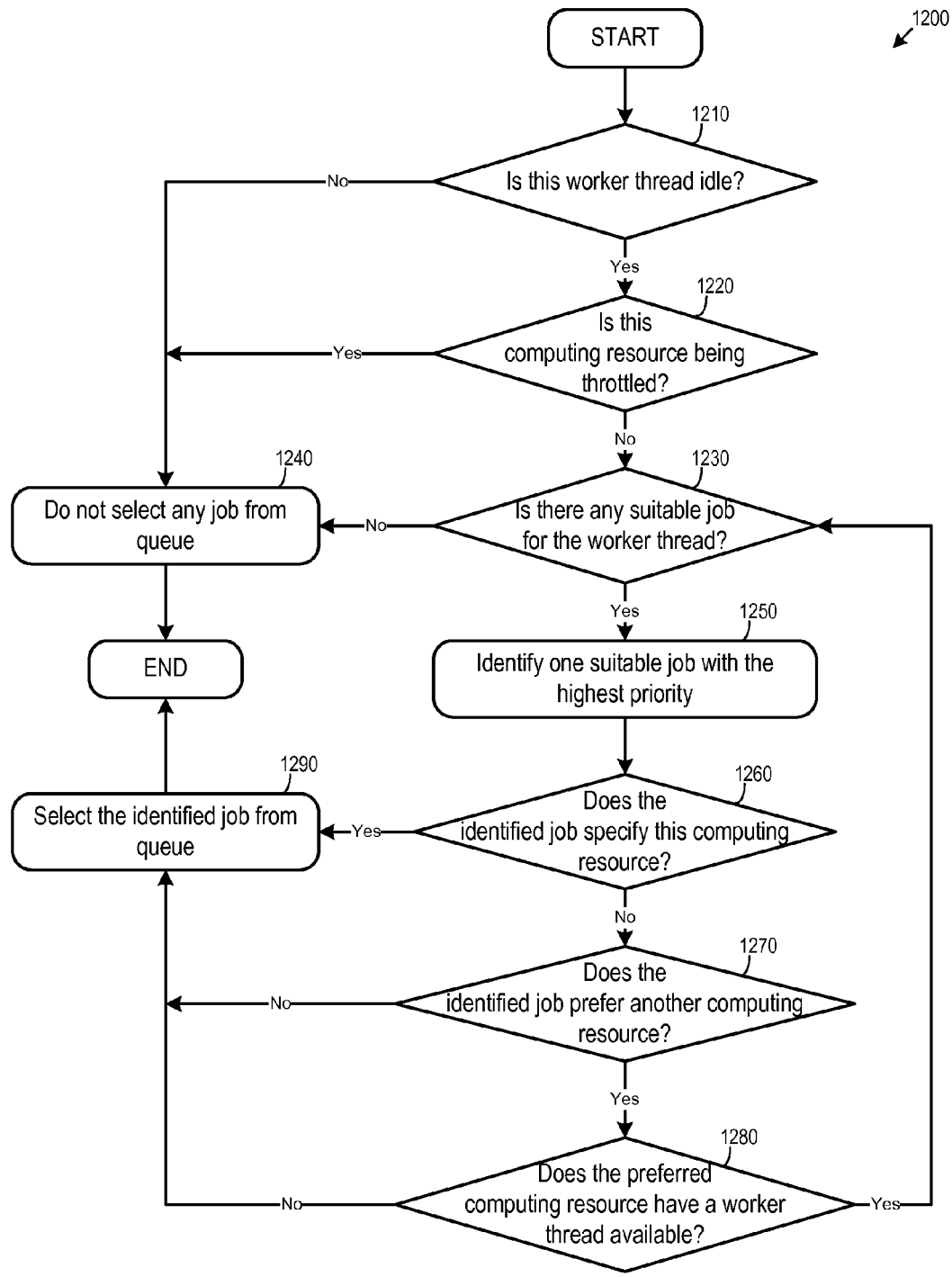
FIG. 12 conceptually illustrates a process performed by individual worker threads to select jobs from the queues.

For some of these embodiments, FIG. 12 conceptually illustrates a process 1200 performed by individual worker threads to select jobs from the queues. In some embodiments, different worker threads take turn selecting jobs from the queues, and only one worker thread is allowed to perform the job selection operation at one time. Some embodiments utilize mechanisms such as semaphores to ensure that multiple worker threads do not select a same job for execution.

In some embodiments, the process 1200 starts when a worker thread is notified of a change of state in the queuing system. Such a change of state is an event that may allow the worker thread to take on a new job from the queue in some embodiments. For example, since each new job entering the queues may be a job that the worker thread can execute, some embodiments notify the worker thread when a new job has entered into one of the queues. As a further example, some embodiments throttle computing resources to prevent them from producing too much data too quickly. A worker thread for a throttled computing resource would not be able to take on a new job until the throttle condition is lifted. Thus, the lifting of a throttle condition is also an event that causes the worker thread to be notified.

The process determines (at 1210) whether this worker thread (i.e., the worker that is performing the process 1200) is idle. A worker thread that is busy performing another job would ignore the notification. In some embodiments, only computing resources with idle worker threads are allow to take on new jobs from the queues. As such, the processing load of the system will be distributed evenly across the computing resources, since only computing resources with surplus processing capacity would have idle worker threads. If this worker thread is not idle, the process proceeds to 1240 and ends without selecting a job from the queues. If this worker thread is idle and available for performing a new job, the process proceeds to 1220.

At 1220, the process determines whether the computing resource associated with this worker thread is being throttled. In some embodiments, when the system is throttling a particular computing resource, the computing resource would either finish the jobs that it is currently executing or suspends them. However, the worker threads of the computing resource, even if idle, will not take on new jobs for the computing resource to execute. If the computing resource of this worker thread is under a throttle condition, the process 1200 proceeds to 1240 and ends without selecting a job from the queues. If the computing resource for this worker thread is not currently being throttled, the process proceeds to 1230.

At 1230, the process determines whether there are suitable jobs in the queues for this worker thread to perform. Jobs that have already been selected by another worker thread are of course unsuitable. In some embodiments, each worker thread is dedicated to performing a particular type of jobs for a particular computing resource, therefore jobs with parameters (such as those illustrated in FIG. 9) that indicate another job type or require another computing resource are not suitable for this worker thread. For example, a job that has been specified to be performed by GPU-A is not suitable for a worker thread of either CPU or GPU-B, and a buffer copy job is not suitable for a worker thread that is dedicated to performing rendering. Some embodiments thus make this determination by examining queues to see if there are any suitable jobs for this worker thread. In some embodiments, the process examines only queues that are dedicated to jobs that match the worker thread. In the example of FIG. 8, a rendering worker thread for GPU-B 853 would examine only the render jobs queue 830, while a buffer copying thread dedicated to data transfers from CPU to GPU would examine only the queue 832, which is a queue for buffer copy jobs from CPU to GPU. If there is at least one suitable job with parameters that matches the worker thread, the process proceeds to 1250. Otherwise, the process 1200 proceeds to 1240 and ends without selecting a job from the queues.

At 1250, the process identifies one suitable job with the highest priority. There can be multiple jobs in the queues that are suitable for this worker thread, and process would try to perform higher priority jobs before lower priority jobs (e.g., by examining the priority parameter 930 of each job). There can also be multiple suitable jobs with the same highest priority. In these situations, the process 1200 would identify only one of these multiple highest priority suitable jobs. In some embodiments, the job queues are both prioritized and first-in, first-out (FIFO). Thus, if there are multiple highest priority suitable jobs in a queue, the process would identify the job that was the earliest to enter the queue.

Next, the process determines (at 1260) whether the identified job specifies the computing resource of this worker thread. As mentioned earlier, a job that specifies a particular computing resource is a job that must be performed on that particular resource and not any other. If the identified job (a suitable job with the highest priority) specifies the computing resource of this worker thread, the process proceeds to 1290 to select the identified job from queue for execution. Otherwise the process proceeds to 1270.

At 1270, the process determines whether the identified job prefers another computing resource. A job that prefers another computing resource is a job that is better off being performed on that other computing resource. If the identified job does not prefer another computing resource (e.g., the job either prefers the computing resource of this worker thread or has no preference at all), the process proceeds to 1290 to select the identified job from queue for execution. Otherwise, the process proceeds to 1280.

At 1280, the process determines whether the computing resource preferred by the identified job has an idle worker thread. The process would not let this worker thread execute the identified job if a more suitable computing resource is available for executing the identified job. However, if the computing resource preferred by the identified job is not available to execute the identified job, (e.g., if none of its worker threads is idle or if the computing resource is under throttle condition), the process would allow this worker thread to execute the identified job. In that case, the process proceeds to 1290 to select the identified job from queue for execution. Otherwise, if the computing resource preferred by the identified job has an idle worker thread, the process would leave the identified job in the queues for the preferred computing resource to execute. In that case, the process proceeds to 1230 to see if there are other suitable jobs.

Figure 13:
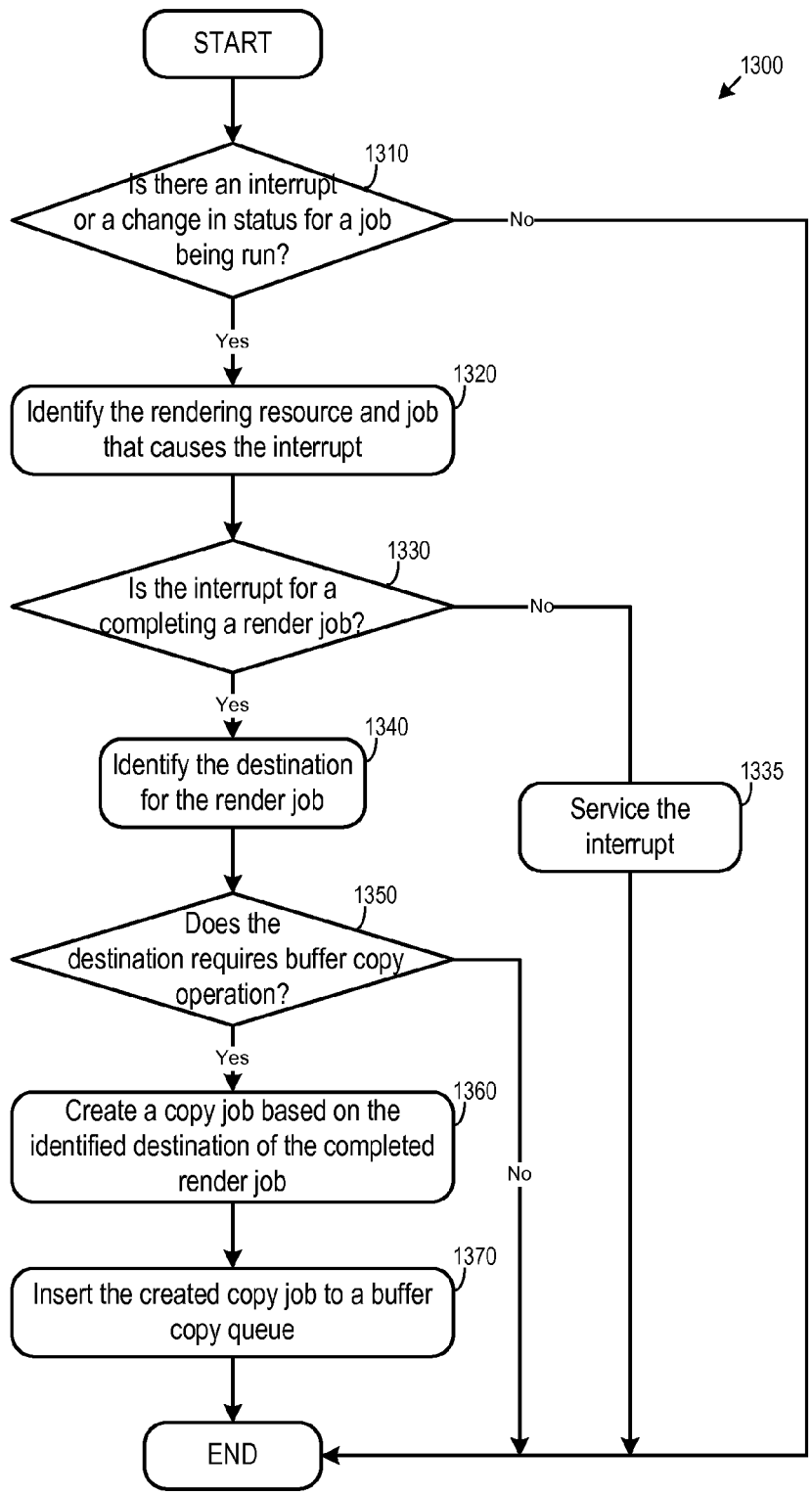
FIG. 13 conceptually illustrates a process for creating buffer copying jobs.

As mentioned, the job management layer creates a buffer copy job for copying the result of a render job from one memory structure to another if the job specifies a destination memory location that does not reside with the computing resource that perform the rendering (i.e., is not in a memory structure that is closely coupled with the rendering engine). FIG. 13 conceptually illustrates a process 1300 for creating these buffer copying jobs.

In some embodiments, the process 1300 starts whenever there are rendering job in the queue waiting to be executed. In some embodiments, the process 1300 starts whenever any of the computing resources is performing a rendering job. The process determines (at 1310) whether there is an interrupt or a change in status for a rendering job that is being executed on one of the rendering resources. If there is such a change in status or interrupt, the process proceeds to 1320. Otherwise, the process 1300 ends.

The process identifies (1320) the rendering resource and the job that is causing the interrupt or change in status. The process then determines (at 1330) whether the interrupt or the change in status is for the completion of a rendering job. If so, the process proceeds to 1340. Otherwise, the process proceeds to 1335 to service the interrupt (or change in status) and ends.

If the interrupt is indeed related to the completion of a rendering job, the process identifies (at 1340) the destination of the rendering job. In some embodiments, the process makes this determination based on one of the parameters of the rendering job (e.g., render destination specification 904.) The process then determines (at 1350) whether the destination specification requires a buffer copying operation, i.e., whether job specifies a destination memory location that reside with the computing resource that perform the rendering. If there is no need to perform such a buffer copying operation (i.e., the destination memory location already resides with the computing resource), the process 1300 ends. If the buffer copying operation is needed, the process proceeds to 1360.

At 1360, the process creates a buffer copying job based on the identified destination of the completed render job. In some embodiments, the process specifies a source memory location and a destination memory location for the buffer copying job. The source memory location is based on the resource specification of the render job (e.g., 902) and the destination memory location is based on the destination specification of the render job (e.g., 904).

The process then inserts (at 1370) this newly created buffer job to a buffer copy queue. For some embodiments includes a separate CPU to GPU queue (such as 832) and GPU to CPU queue (such as 834), the process adds the newly created buffer job to one of the queues according to the rendering resource and destination specification of the job. When the buffer copying job is subsequently selected for execution, the job management layer will set up a DMA channel based on the source memory location the destination memory location specified for the buffer copying job. After inserting the newly created job to a buffer copying queue, the process 1300 ends.

III. Computer Systems

Figure 14:
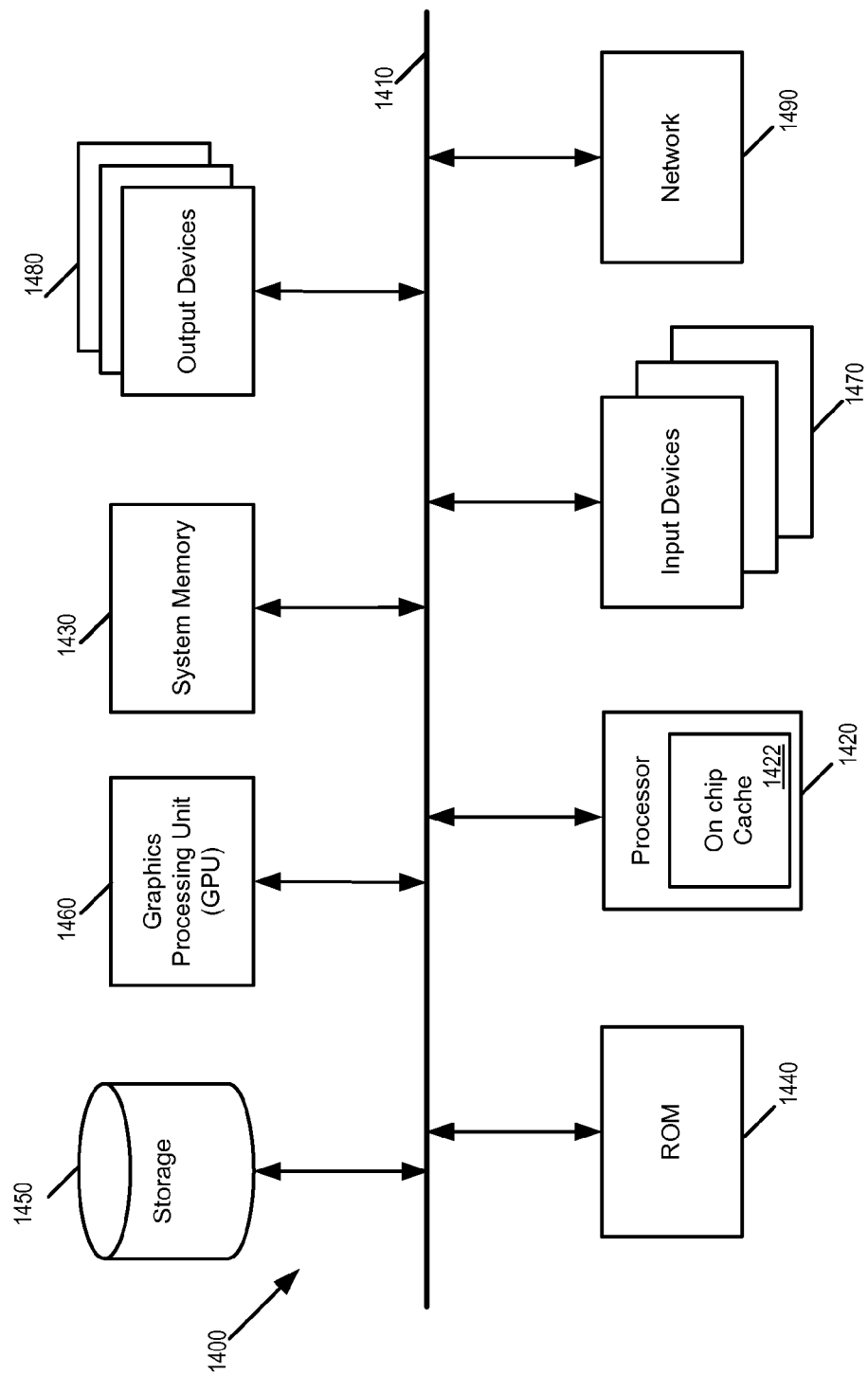
FIG. 14 conceptually illustrates a computer system with which some embodiments of the invention are implemented.

FIG. 14 conceptually illustrates a computer system 1400 with which some embodiments of the invention are implemented. For example, the systems (and/or sub-systems) described above in reference to FIGS. 1, 2, 3, and 6-8 may be at least partially implemented using sets of instructions that are run on the computer system 1400. As another example, the processes described in reference to FIGS.

10-13 may be at least partially implemented using sets of instructions that are run on the computer system 1400.

Such a computer system includes various types of computer readable mediums and interfaces for various other types of computer readable mediums. Computer system 1400 includes a bus 1410, a processor 1420 (e.g., a CPU), a system memory 1430, a read-only memory (ROM) 1440, a permanent storage device 1450, a graphics processing unit ("GPU") 1460, input devices 1470, output devices 1480, and a network connection 1490. The components of the computer system 1400 are electronic devices that automatically perform operations based on digital and/or analog input signals.

One of ordinary skill in the art will recognize that the computer system 1400 may be embodied in other specific forms without deviating from the spirit of the invention. For instance, the computer system may be implemented using various specific devices either alone or in combination. For example, a local PC may include the input devices 1470 and output devices 1480, while a remote PC may include the other devices 1410-1460, with the local PC connected to the remote PC through a network that the local PC accesses through its network connection 1490 (where the remote PC is also connected to the network through a network connection).

The bus 1410 collectively represents all system, peripheral, and chipset buses that communicatively connect the numerous internal devices of the computer system 1400. In some cases, the bus 1410 may include wireless and/or optical communication pathways in addition to or in place of wired connections. For example, the input devices 1470 and/or output devices 1480 may be coupled to the system 1400 using a wireless local area network (W-LAN) connection, Bluetooth®, or some other wireless connection protocol or system.

The bus 1410 communicatively connects, for example, the processor 1420 with the system memory 1430, the ROM 1440, and the permanent storage device 1450. From these various memory units, the processor 1420 retrieves instructions to execute and data to process in order to execute the processes of some embodiments. In some embodiments the processor includes an FPGA, an ASIC, or various other electronic components for executing instructions. In some embodiments, the processor 1420 uses an on-chip cache 1422 (e.g., an L1 cache) to hold data recently accessed or produced by the processor 1420.

The ROM 1440 stores static data and instructions that are needed by the processor 1420 and other modules of the computer system. The permanent storage device 1450, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1450.

Other embodiments use a removable storage device (such as a floppy disk, flash drive, or CD-ROM) as the permanent storage device. Like the permanent storage device 1450, the system memory 1430 is a read-and-write memory device. However, unlike storage device 1450, the system memory 1430 is a volatile read-and-write memory, such as a random access memory (RAM). The system memory stores some of the instructions and data that the processor needs at runtime. In some embodiments, the sets of instructions and/or data used to implement the invention's processes are stored in the system memory 1430, the permanent storage device 1450, and/or the read-only memory 1440. For example, the various memory units include instructions for processing multimedia items in accordance with some embodiments.

In addition, the bus 1410 connects to the GPU 1460. The GPU of some embodiments performs various graphics processing functions. These functions may include display functions, rendering, compositing, and/or other functions related to the processing or display of graphical data. In some embodiments, the system 1400 may include multiple GPUs.

The bus 1410 also connects to the input devices 1470 and output devices 1480. The input devices 1470 enable the user to communicate information and select commands to the computer system. In some embodiments, these operations and functionalities are performed based on different commands that are received from users through different input devices (e.g., keyboard, trackpad, touchpad, mouse, etc.). Some embodiments use a cursor in a graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The input devices also include audio input devices (e.g., microphones, MIDI musical instruments, etc.) and video input devices (e.g., video cameras, still cameras, optical scanning devices, etc.). The output devices 1480 include printers, electronic display devices that display still or moving images, and electronic audio devices that play audio generated by the computer system. For instance, these display devices may display a graphical user interface ("GUI"). The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system. Some embodiments include devices such as a touchscreen that function as both input and output devices.

Finally, as shown in FIG. 14, bus 1410 also couples computer 1400 to a network 1490 through a network adapter (not shown). In this manner, the computer can be a part of a network of computers (such as a local area network ("LAN"), a wide area network ("WAN"), an Intranet, or a network of networks, such as the Internet. For example, the computer 1400 may be coupled to a web server (network 1490) so that a web browser executing on the computer 1400 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computer system 1400 may be used in conjunction with the invention. Moreover, one of ordinary skill in the art will appreciate that any other system configuration may also be used in conjunction with the invention or components of the invention. For example, in some embodiments, the system 1400 may not include a GPU 1460.

In addition, while the examples shown illustrate many individual modules as separate blocks one of ordinary skill in the art would recognize that some embodiments may combine these modules into a single functional block or element. One of ordinary skill in the art would also recognize that some embodiments may divide a particular module into multiple modules.

One of ordinary skill in the art will realize that, while the invention has been described with reference to numerous specific details, the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory computer readable medium storing an operating system which when executed by at least one processor of a computing device allows media editing applications to interact with a plurality of computing resources of the computing device in order to generate media presentations, the operating system comprising sets of instructions for:
    performing image processing operations on media content received from the media editing applications, each image processing operation comprising a plurality of image processing jobs;
    assigning said image processing operations to be concurrently performed by the plurality of computing resources, wherein each image processing job comprises a resource specification that identifies one of the computing resources for performing the image processing job;
    creating a data transfer job for an image processing job when an output of the performed image processing job is not stored at a particular memory location, wherein the particular memory location is specified by a media editing application to which the image processing job belongs; and
    generating different media presentations for the media editing applications based on the performed image processing operations.

2. The non-transitory computer readable medium of claim 1, wherein the resource specification for a particular image processing job is specified by a media editing application, wherein the operating system further comprises a set of instructions for providing an application programming interface (API) for the media editing application to specify the resource specification through the API.

3. The non-transitory computer readable medium of claim 1, wherein the operating system further comprises a set of instructions for creating a plurality of storage queues for queuing the plurality of image processing jobs.

4. The non-transitory computer readable medium of claim 1, wherein each image processing job further comprises a priority specification of the image processing job.

5. The non-transitory computer readable medium of claim 1, wherein the plurality of concurrent computing resources comprises at least one processing unit and one direct memory access (DMA) channel.

6. A system for performing a plurality of sets of image processing instructions, the system comprising:
    a storage queue for queuing image processing jobs comprising sets of image processing instructions, wherein each image processing job comprises a resource specification that identifies a particular renderer for performing the image processing job, a priority specification, and an output destination specification that identifies a particular memory location for storing an output of the performed image processing job;
    a first renderer for executing a first set of image processing instructions in a first image processing job that specifies the first renderer in the resource specification;
    a second renderer for executing a second set of image processing instructions in a second image processing job; and
    a direct memory access (DMA) controller for performing a data transfer operation to transfer a block of data from a first memory location to a second memory location while the first and second renderers are concurrently executing the first and second sets of image processing instructions, wherein the block of data is produced by the second renderer and the second memory location is specified by the output destination specification of the second image processing job that is processed by the second renderer, wherein the first memory location is closely coupled with the second renderer.

7. The system of claim 6, wherein the first renderer is associated with a graphics processing unit ("GPU"), while the second renderer is associated with a central processing unit ("CPU").

8. The system of claim 6, wherein the first renderer is associated with a first graphics processing unit ("GPU"), while the second renderer is associated with a second GPU.

9. The system of claim 8, wherein the first memory location comprises a video memory (VRAM) of the second GPU, while the second image processing job specifies the second memory location to be the output location of the performed second image processing job.

10. The system of claim 6, wherein the first and second image processing jobs are received from a media editing application, wherein the first and second renderers concurrently execute the first and second sets of image processing instructions in order to generate a real-time playback for the media editing application.

11. The system of claim 6, wherein the block of data is a pixel buffer object (PBO).

12. The system claim of 6, wherein the block of data is a first block of data, wherein the DMA controller is further for transferring a second block of data from a third memory location to a fourth memory location, wherein the second block of data is an output produced by the first renderer based on the first set of image processing instructions and the third memory location is closely coupled with the first renderer.

13. A non-transitory computer readable medium storing a computer program which when executed by at least one processor assigns a plurality of image processing instruction sets to a plurality of renderers for execution, the computer program comprising sets of instructions for:
storing a set of image processing jobs in a rendering queue, each image processing job comprising a set of image processing instructions, a resource specification that identifies a particular renderer of the plurality of renderers for performing the image processing job, and an output destination specification that identifies a particular memory location for storing an output of the performed image processing job;
assigning a first set of image processing instructions of a first image processing job of the set of image processing jobs to a first renderer for execution, wherein the resource specification of the first image processing job specifies the first renderer;
assigning a second set of image processing instructions of a second image processing job of the set of image processing jobs to a second renderer for execution; and
assigning a direct memory access operation to a direct memory access (DMA) controller for transferring a block of data from a first memory location to a second memory location while the first and second renderers concurrently execute the first and second sets of image processing instructions, wherein the block of data is produced by the second renderer and the second memory location is specified by the output destination specification of the second image processing job, wherein the first memory location is closely coupled with the second renderer.

14. The non-transitory computer readable medium of claim 13, wherein the block of data is a pixel buffer object (PBO).

15. The non-transitory computer readable medium of claim 13, wherein the resource specification for the second image processing job specifies a preference for the second renderer.

16. The non-transitory computer readable medium of claim 13, wherein the DMA operation is specified by a data transfer job stored in a queue that is different from the rendering queue.

17. The non-transitory computer readable medium of claim 16, wherein the data transfer job is a first data transfer job, wherein the computer program further comprises a set of instructions for generating a second data transfer job for copying an output of the first set of image processing instructions from a third memory location to a fourth memory location, wherein the third memory location is closely coupled with the first renderer.

18. A non-transitory computer readable medium storing a computer program for execution by at least one processor, the computer program comprising sets of instructions for:
creating a first storage queue for queuing rendering jobs to be concurrently processed by a plurality of computing resources, wherein a rendering job specifies a resource specification that identifies a particular computing resource of the plurality of computing resources for performing the rendering job, a priority specification, and an output destination specification that identifies a particular memory location for storing an output of the performed rendering job;
creating a second storage queue for queuing data transfer jobs; and
assigning the queued rendering jobs and the queued data transfer jobs to the plurality of computing resources for execution based on the resource specification of each rendering job, wherein at least one of the data transfer jobs is for copying a block of data from a first memory location to a second memory location, wherein the block of data is produced by a particular computing resource when performing a particular rendering job from the first storage queue and the second memory location is specified by the output specification of the particular rendering job, wherein the first memory location is closely coupled with the particular computing resource.

19. The non-transitory computer readable medium of claim 18, wherein the plurality of computing resources comprises a plurality of renderers.

20. The non-transitory computer readable medium of claim 19, wherein the plurality of computing resources further comprises a plurality of direct memory access (DMA) channels.

21. The non-transitory computer readable medium of claim 18, wherein the plurality of computing resources comprises at least a central processing unit (CPU) and a graphics processing unit (GPU).

22. The non-transitory computer readable medium of claim 21, wherein the plurality of computing resources further comprises at least one direct memory access (DMA) controller.

23. The non-transitory computer readable medium of claim 18, wherein the resource specification of particular rendering job requires the particular computing resource to perform the particular rendering job.

24. The non-transitory computer readable medium of claim 23, wherein the particular rendering job is a first rendering job and the particular computing resource is a first computing resource, wherein a resource specification of a second rendering job prefers a second computing resource to perform the second rendering job.

25. The non-transitory computer readable medium of claim 24, wherein a resource specification of a third rendering job allows the third rendering job to be performed by any computing resource.

26. The non-transitory computer readable medium of claim 24, wherein the computer program further comprises a set of instructions for assigning the second rendering job to the first computing resource.

* * * * *